United States Patent ………………………………… US 11,997,686 B2
Ji et al. ………………………………………………………… (45) Date of Patent: May 28, 2024

(54) TRANSMISSION APPARATUS AND METHOD OF FEEDBACK INFORMATION

(71) Applicant: FUJITSU LIMITED, Kawasaki (JP)

(72) Inventors: Pengyu Ji, Beijing (CN); Jian Zhang, Beijing (CN); Guorong Li, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 591 days.

(21) Appl. No.: 17/183,924

(22) Filed: Feb. 24, 2021

(65) Prior Publication Data

US 2021/0243790 A1    Aug. 5, 2021

Related U.S. Application Data

(63) Continuation of application No. PCT/CN2018/107997, filed on Sep. 27, 2018.

(51) Int. Cl.
*H04L 1/1607* (2023.01)
*H04L 1/1867* (2023.01)
*H04W 72/0446* (2023.01)
*H04W 72/1263* (2023.01)
*H04W 72/23* (2023.01)
*H04W 72/50* (2023.01)

(52) U.S. Cl.
CPC .......... *H04W 72/23* (2023.01); *H04L 1/1896* (2013.01); *H04W 72/0446* (2013.01); *H04W 72/1263* (2013.01); *H04W 72/535* (2023.01)

(58) Field of Classification Search
None
See application file for complete search history.

(56) References Cited

U.S. PATENT DOCUMENTS

| 10,834,646 | B2* | 11/2020 | Uchiyama | H04W 40/22 |
| 2016/0021566 | A1 | 1/2016 | Kimura et al. | |
| 2016/0227463 | A1 | 8/2016 | Baligh et al. | |
| 2016/0374068 | A1* | 12/2016 | Kim | H04W 4/06 |
| 2017/0347394 | A1 | 11/2017 | Yasukawa et al. | |
| 2018/0035448 | A1* | 2/2018 | Gupta | H04W 72/23 |
| 2019/0053204 | A1* | 2/2019 | Lien | H04W 4/40 |
| 2019/0075566 | A1* | 3/2019 | Kim | H04L 1/1845 |
| 2019/0174530 | A1* | 6/2019 | Kim | H04W 72/12 |

(Continued)

FOREIGN PATENT DOCUMENTS

| CN | 101527623 A | 9/2009 |
| CN | 105075367 A | 11/2015 |

(Continued)

OTHER PUBLICATIONS

Notice of Reasons for Refusal issued by the Japan Patent Office for corresponding Japanese Patent Application No. 2021-510414, dated Apr. 26, 2022, with an English translation.

(Continued)

*Primary Examiner* — Ajit Patel
(74) *Attorney, Agent, or Firm* — Myers Wolin, LLC

(57) ABSTRACT

A transmission apparatus and method of feedback information. A user equipment receives or generates sidelink feedback information and transmit the sidelink feedback information to a network device, thereby providing a feedback mechanism of sidelink transmission, and improving reliability of data transmission of a sidelink.

8 Claims, 23 Drawing Sheets

(56) References Cited

U.S. PATENT DOCUMENTS

| | | | |
|---|---|---|---|
| 2019/0327724 A1 | 10/2019 | Zhao | |
| 2019/0364590 A1* | 11/2019 | Sartori | H04W 72/23 |
| 2020/0236666 A1* | 7/2020 | Yu | H04L 1/1812 |

FOREIGN PATENT DOCUMENTS

| | | |
|---|---|---|
| CN | 107079437 A | 8/2017 |
| CN | 107211338 A | 9/2017 |
| CN | 108322414 A | 7/2018 |
| EP | 3 522 592 A1 | 8/2019 |
| JP | 2016-523498 A | 8/2016 |
| JP | 2018-56813 A | 4/2018 |
| WO | 2018/166607 A1 | 9/2018 |

OTHER PUBLICATIONS

Intel Corporation, "Analysis of Mutual Impact of WAN and D2D Communication", Agenda Item: 6.2.5.2.4, 3GPP TSG-RAN WG1 Meeting #77, R1-142685, Seoul, Korea, May 19-23, 2014.

International Search Report and Written Opinion of the International Searching Authority issued by the State Intellectual Property Office of the P. R. China for corresponding International Patent Application No. PCT/CN2018/107997, dated Jun. 28, 2019, with an English translation.

Samsung, "Discussion on enhancements of LTE Uu and NR Uu to control NR sidelink", Agenda Item: 7.2.4.1.1, 3GPP TSG-RAN WG1 Meeting #94, R1-1808781, Gothenburg, Sweden, Aug. 20-24, 2018.

First Notification of Office Action and Search Report issued by the China National Intellectual Property Administration for corresponding Chinese Patent Application No. 201880096977.4, dated Jun. 12, 2023, with an English translation.

Second Notification of Office Action and Search Report issued by the China National Intellectual Property Administration for corresponding Chinese Patent Application No. 201880096977.4, mailed on Jan. 9, 2024, with an English translation.

* cited by examiner

|  | | Transmission occasion 0 | Transmission occasion 1 | Transmission occasion 2 |
|---|---|---|---|---|
| UE0 | Sidelink transmission Carrier 0 | 11 |  | 11 |
| | Sidelink transmission Carrier 1 |  | 01 | 11 |
| UE1 | Sidelink transmission Carrier 0 | 10 |  | 11 |
| | Sidelink transmission Carrier 1 |  | 11 | 10 |
| UE2 | Sidelink transmission Carrier 0 | 11 |  | 00 |
| | Sidelink transmission Carrier 1 |  | 01 | 01 |

FIG. 10

TRANSMISSION APPARATUS AND METHOD OF FEEDBACK INFORMATION

CROSS-REFERENCE TO RELATED APPLICATION

This application is a continuation application of International Application PCT/CN2018/107997 filed on Sep. 27, 2018 and designated the U.S., the entire contents of which are incorporated herein by reference.

TECHNICAL FIELD

This disclosure relates to the field of communication technologies, and in particular to a transmission apparatus and method of feedback information.

BACKGROUND

Vehicle communication services are called V2X services. V2X services may include multiple types, such as vehicle-to-vehicle (V2V) communication services, vehicle-to-infrastructure (V2I) communication services, and vehicle-to-pedestrian (V2P) communication services, etc.

In existing V2X communication, data transmission is performed between vehicles as user equipments (UEs) in a sidelink via a PC5 interface. For a sidelink data channel PSSCH, a specific resource used by it is indicated a corresponding physical sidelink control channel PSCCH, and data transmission may be performed between a vehicle and a network device via an uplink and a downlink and a Uu interface. In LTE-based V2X communication (LTE-V2X) in R-15 and previous versions thereof, services on a sidelink are all transmitted via broadcast, and a receiving UE does not need to feedback transmission data packets. On the sidelink, a UE transmitting data is referred to as a source UE, and a UE receiving data is referred to as a target UE.

It should be noted that the above description of the background is merely provided for clear and complete explanation of this disclosure and for easy understanding by those skilled in the art. And it should not be understood that the above technical solution is known to those skilled in the art as it is described in the background of this disclosure.

It was found by the inventors that in NR-V2X (New Radio vehicle communication), due to a need to support unicast, groupcast and broadcast services on a sidelink at the same time and there exists a requirement on reliability of data transmission higher than that in LTE-V2X, for unicast and groupcast services, the reliability of data transmission may be improved by supporting feedback. When the source UE is in a cell coverage of the network device at this moment, the network device needs to obtain feedback information of the sidelink transmission at this time. When the feedback is found to be not acknowledged (NACK), the network device may reschedule resources so that the source UE may perform retransmission to the target UE. Therefore, in NR-V2X, for a scenario where the source UE is in the cell coverage, a corresponding feedback mechanism needs to be established.

Embodiments of this disclosure provide a transmission apparatus and method of feedback information, in which a user equipment receives or generates sidelink feedback information and transmits the sidelink feedback information to a network device, thereby providing a feedback mechanism for sidelink transmission, which may improve reliability of data transmission of the sidelink.

According to a first aspect of the embodiments of this disclosure, there is provided a transmission apparatus of feedback information, provided at a first user equipment side or a second user equipment side, the apparatus including: a first receiving unit configured to receive sidelink feedback information by the first user equipment, or a generating unit configured to generate sidelink feedback information by the second user equipment; and a first transmitting unit configured to transmit the sidelink feedback information to a network device, the sidelink feedback information being feedback information of sidelink transmission from the first user equipment to the second user equipment.

According to a second aspect of the embodiments of this disclosure, there is provided a transmission apparatus of feedback information, provided at a first user equipment side, the apparatus including: a fourth receiving unit configured to receive indication information related to transmission of feedback information from a network device; and a second transmitting unit configured to forward the indication information related to transmission of feedback information to a second user equipment; wherein the first user equipment performs sidelink transmission to the second user equipment.

According to a third aspect of the embodiments of this disclosure, there is provided a transmission apparatus of feedback information, provided at a second user equipment side, the apparatus including: a third transmitting unit configured to transmit to a first user equipment feedback information of sidelink transmission performed by the first user equipment to a second user equipment.

According to a fourth aspect of the embodiments of this disclosure, there is provided a transmission apparatus of feedback information, provided at a user equipment side, the apparatus including: a fourth transmitting unit configured to transmit feedback information of sidelink transmission from the user equipment to another user equipment and feedback information of downlink transmission between the user equipment and a network device to the network device.

According to a fifth aspect of the embodiments of this disclosure, there is provided a transmission apparatus of feedback information, provided at a first user equipment side, the apparatus including: a fifth receiving unit configured to receive indication information related to transmission of feedback information from a network device; a sixth receiving unit configured to respectively receive, from at least two second user equipments belonging to a group, feedback information of sidelink transmission from the first user equipment to the at least two second user equipments; and a fifth transmitting unit configured to transmit feedback information of sidelink transmission to the network device according to the indication information related to transmission of feedback information and the feedback information of sidelink transmission from the first user equipment to the at least two second user equipments.

According to a sixth aspect of the embodiments of this disclosure, there is provided a transmission apparatus of feedback information, provided at a network device side, the apparatus including: a sixth transmitting unit configured to transmit indication information related to transmission of feedback information to a first user equipment or a second user equipment; and a seventh receiving unit configured to receive from the first user equipment or the second user equipment feedback information of sidelink transmission from the first user equipment to the second user equipment.

According to a seventh aspect of the embodiments of this disclosure, there is provided a transmission apparatus of feedback information, provided at a network device side, the apparatus including: an eighth transmitting unit configured to transmit indication information related to transmission of feedback information to a first user equipment; and an eighth receiving unit configured to receive from the first user equipment feedback information of sidelink transmission from the first user equipment to at least two second user equipments belonging to a group.

According to an eighth aspect of the embodiments of this disclosure, there is provided a user equipment, including the apparatuses as described in the first to fifth aspects of the embodiments of this disclosure.

According to a ninth aspect of the embodiments of this disclosure, there is provided a network device, including the apparatus as described in the sixth or the seventh aspect of the embodiments of this disclosure.

According to a tenth aspect of the embodiments of this disclosure, there is provided a communication system, including the user equipment as described in the eighth aspect of the embodiments of this disclosure and/or the user equipment as described in the ninth aspect of the embodiments of this disclosure.

According to an eleventh aspect of the embodiments of this disclosure, there is provided a transmission method of feedback information, applied to a first user equipment side or a second user equipment side, the method including: receiving sidelink feedback information by the first user equipment, or generating sidelink feedback information by the second user equipment; and transmitting the sidelink feedback information to a network device, the sidelink feedback information being feedback information of sidelink transmission from the first user equipment to the second user equipment.

According to a twelfth aspect of the embodiments of this disclosure, there is provided a transmission method of feedback information, applied to a first user equipment side, the method including: receiving indication information related to transmission of feedback information from a network device; and forwarding the indication information related to transmission of feedback information to a second user equipment; wherein the first user equipment performs sidelink transmission to the second user equipment.

According to a thirteenth aspect of the embodiments of this disclosure, there is provided a transmission method of feedback information, applied to a second user equipment side, the method including: transmitting to a first user equipment feedback information of sidelink transmission performed by the first user equipment to a second user equipment.

According to a fourteenth aspect of the embodiments of this disclosure, there is provided a transmission method of feedback information, applied to a user equipment side, the method including: transmitting feedback information of sidelink transmission from the user equipment to another user equipment and feedback information of downlink transmission between the user equipment and a network device to the network device.

According to a fifteenth aspect of the embodiments of this disclosure, there is provided a transmission method of feedback information, applied to a first user equipment side, the method including: receiving indication information related to transmission of feedback information from a network device; respectively receiving, from at least two second user equipments belonging to a group, feedback information of sidelink transmission from the first user equipment to the at least two second user equipments; and transmitting feedback information of sidelink transmission to the network device according to the indication information related to transmission of feedback information and the feedback information of sidelink transmission from the first user equipment to the at least two second user equipments.

According to a sixteenth aspect of the embodiments of this disclosure, there is provided a transmission method of feedback information, applied to a network device side, the method including: transmitting indication information related to transmission of feedback information to a first user equipment or a second user equipment; and receiving from the first user equipment or the second user equipment feedback information of sidelink transmission from the first user equipment to the second user equipment.

According to a seventeenth aspect of the embodiments of this disclosure, there is provided a transmission method of feedback information, applied to a network device side, the method including: transmitting indication information related to transmission of feedback information to a first user equipment; and receiving from the first user equipment feedback information of sidelink transmission from the first user equipment to at least two second user equipments belonging to a group.

According to an eighteenth aspect of the embodiments of this disclosure, there is provided a computer readable program code, which, when executed in a transmission apparatus of feedback information or a user equipment, will cause the transmission apparatus of feedback information or the user equipment to carry out the transmission method of feedback information described in any one of the eleventh to the fifteenth aspects of the embodiments of this disclosure.

According to a nineteenth aspect of the embodiments of this disclosure, there is provided a computer storage medium, including a computer readable program code, which will cause a transmission apparatus of feedback information or a user equipment to carry out the transmission method of feedback information described in any one of the eleventh to the fifteenth aspects of the embodiments of this disclosure.

According to a twentieth aspect of the embodiments of this disclosure, there is provided a computer readable program code, which, when executed in a transmission apparatus of feedback information or a network device, will cause the transmission apparatus of feedback information or the network device to carry out the transmission method of feedback information described in the sixteenth or the seventeenth aspect of the embodiments of this disclosure.

According to a twenty-first aspect of the embodiments of this disclosure, there is provided a computer storage medium, including a computer readable program code, which will cause a transmission apparatus of feedback information or a network device to carry out the transmission method of feedback information described in the sixteenth or the seventeenth aspect of the embodiments of this disclosure.

An advantage of the embodiments of this disclosure exists in that the user equipment receives or generates sidelink feedback information and transmits the sidelink feedback information to the network device, thereby providing a feedback mechanism for sidelink transmission, which may improve reliability of data transmission of the sidelink.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 10 is a schematic diagram of feedback results of transmission opportunities to which carriers of configuration of sidelink transmission from a first user equipment to at least two second user equipments correspond of Embodiment 3 of this disclosure;

DETAILED DESCRIPTION

Figure 1:
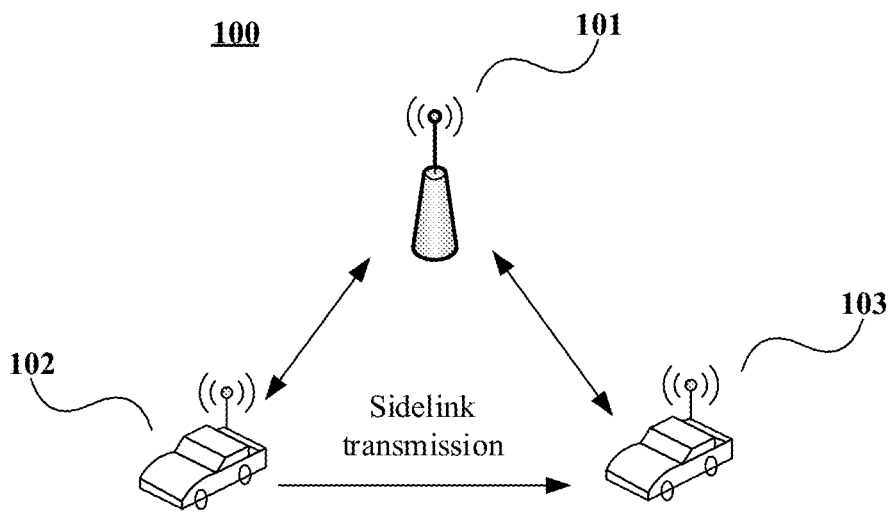
FIG. 1 is a schematic diagram of a communication system of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims. Various embodiments of this disclosure shall be described below with reference to the accompanying drawings. These embodiments are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments, "multiple" or "multiple types" refers to at least two or at least two types.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

In the embodiments of this disclosure, the base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment" or "terminal equipment (TE)" refers to, for example, an equipment accessing to a communication network and receiving network services via a network device, and may also be referred to as "terminal equipment (TE)". The user equipment may be fixed or mobile, and may also be referred to as a mobile station (MS), a terminal, a subscriber station (SS), an access terminal (AT), or a station, etc.

In the embodiments of this disclosure, the user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a user equipment and a network device are taken as examples is schematically shown. As shown in FIG. 1, a communication system 100 may include a network device 101 and user equipments 102, 103. For example, the user equipments 102, 103 are vehicles.

In the embodiment of this disclosure, existing traffics or traffics that may be implemented in the future may be performed between the network device 101 and the user equipments 102, 103. For example, such traffics may include but not limited to enhanced mobile broadband (eMBB), massive machine type communication (MTC), and ultra-reliable and low-latency communication (URLLC), etc.

Traffics on a sidelink may be performed between the user equipments 102, 103. For example, the user equipment 102 is a source UE, and the user equipment 103 is a target UE.

Embodiment 1

Figure 2:
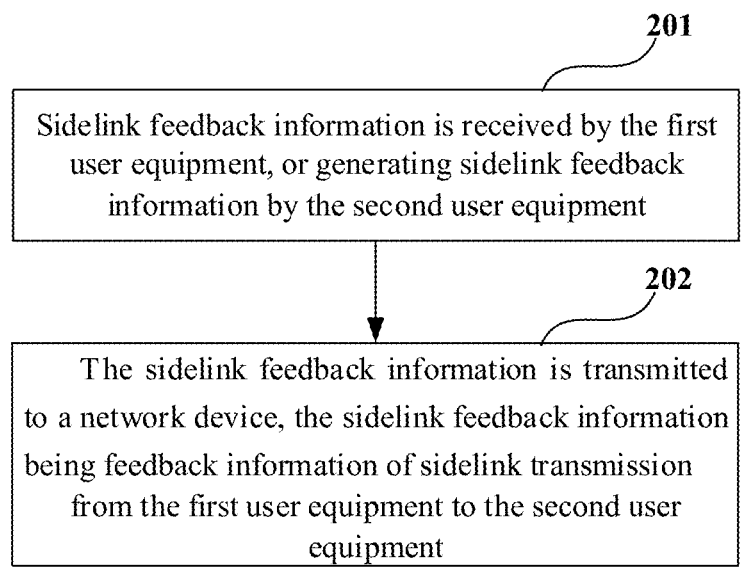
FIG. 2 is a schematic diagram of the transmission method of feedback information of Embodiment 1 of this disclosure.

The embodiment of this disclosure provides a transmission method of feedback information, applied to a first user equipment side or a second user equipment side. FIG. 2 is a schematic diagram of the transmission method of feedback information of Embodiment 1 of this disclosure. As shown in FIG. 2, the method includes:

Step 201: sidelink feedback information is received by the first user equipment, or generating sidelink feedback information by the second user equipment; and Step 202: the sidelink feedback information is transmitted to a network device, the sidelink feedback information being feedback information of sidelink transmission from the first user equipment to the second user equipment.

Hence, the user equipment receives or generates sidelink feedback information and transmits the sidelink feedback information to the network device, thereby providing a feedback mechanism for sidelink transmission, which may improve reliability of data transmission of the sidelink.

In this embodiment, sidelink transmission may be performed between the first user equipment and the second user equipment. The first user equipment is a source UE and the second user equipment is a target UE. Hence, the sidelink transmission is sidelink transmission from the first user equipment to the second user equipment.

Application of the method to the second user equipment side and the first user equipment side shall be described below respectively.

First, application of the method to the second user equipment side (the target UE side) shall be described.

For example, the method may be used in a scenario where the second user equipment is under the same cell coverage as the first user equipment.

Figure 3:
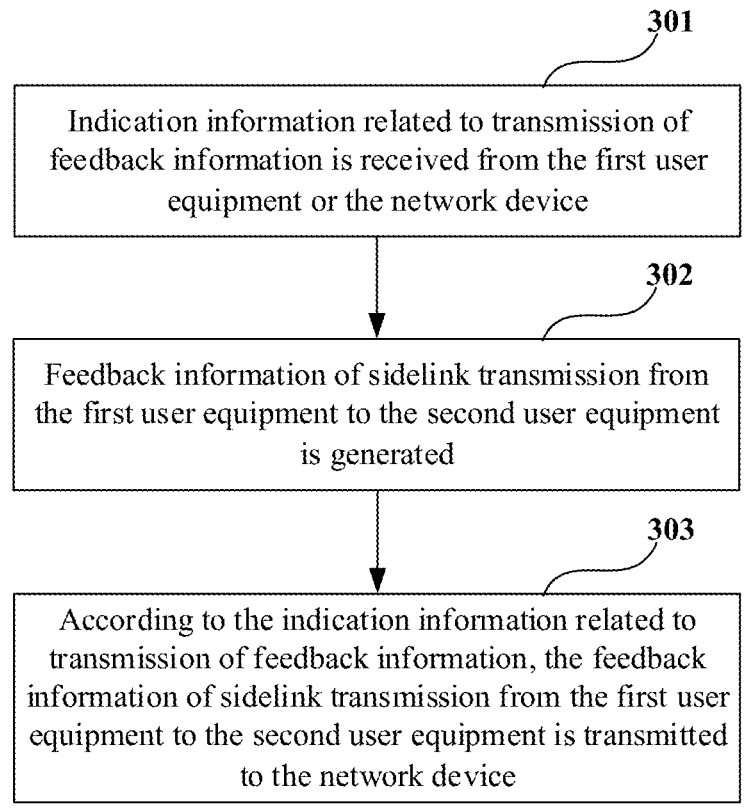
FIG. 3 is another schematic diagram of the transmission method of feedback information of Embodiment 1 of this disclosure.

FIG. 3 is another schematic diagram of the transmission method of feedback information of Embodiment 1 of this disclosure, which is applied to the second user equipment side. As shown in FIG. 3, the method includes:

Step 301: indication information related to transmission of feedback information is received from the first user equipment or the network device;

Step 302: feedback information of sidelink transmission from the first user equipment to the second user equipment is generated; and Step 303: according to the indication information related to transmission of feedback information, the feedback information of sidelink transmission from the first user equipment to the second user equipment is transmitted to the network device.

In this embodiment, the feedback information of sidelink transmission may be transmitted via control signaling.

In this embodiment, in the case of receiving the feedback information of sidelink transmission from the first user equipment, the control signaling is carried by a physical sidelink shared channel (PSSCH).

For example, the control signaling is contained in sidelink control information (SCI).

In this embodiment, in the case of receiving the feedback information of sidelink transmission from the network device, the control signaling is carried by a physical downlink control channel (PDCCH).

For example, the control signaling is contained in downlink control information (DCI).

Figure 4:
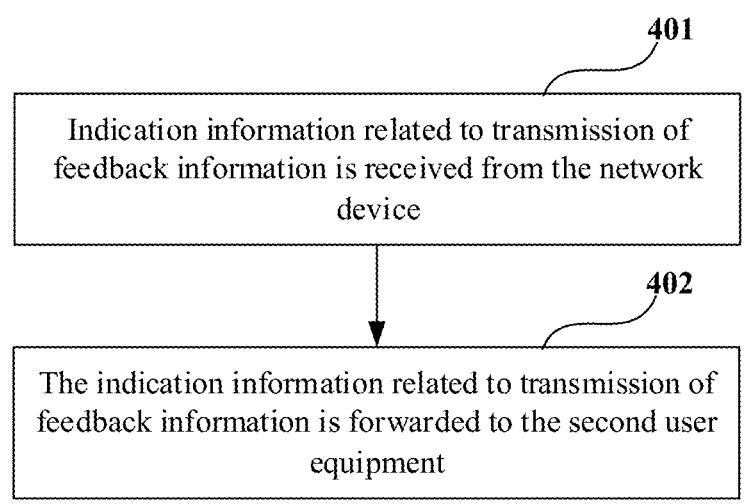
FIG. 4 is a further schematic diagram of the transmission method of feedback information of Embodiment 1 of this disclosure.

Regarding the case where the second user equipment receives the feedback information of sidelink transmission from the first user equipment, FIG. 4 is a further schematic diagram of the transmission method of feedback information of Embodiment 1 of this disclosure, which is applied to the first user equipment side. As shown in FIG. 4, the method includes:

Step 401: indication information related to transmission of feedback information is received from the network device; and Step 402: the indication information related to transmission of feedback information is forwarded to the second user equipment;

the first user equipment performs sidelink transmission to the second user equipment.

In step 401, the indication information related to transmission of feedback information may be received via a physical downlink control channel (PDCCH).

In step 402, the indication information related to transmission of feedback information may be transmitted to the second user equipment via a physical sidelink control channel (PSCCH).

In step 301, in the case where the second user equipment receives the indication information related to transmission of feedback information from the network device, the control signaling is carried by a PDCCH, domains related to scheduling in the PDCCH being set to be invalid, and domains related to feedback being set to be valid. For example, the domains related to scheduling in the DCI are set to be all "0" or all "1" or a predetermined value to indicate that a current domain is invalid. For example, the domains related to scheduling include, but are not limited to, a time domain scheduling domain, a frequency domain scheduling domain, a modulation and coding indicator domain, and an MCS indicator domain, and the domains indicating invalidation may also include a carrier indicator domain.

In this case, the network device further transmits a PDCCH for sidelink scheduling to the first user equipment taken as a source UE of the sidelink, the domains related to scheduling in the PDCCH being set to be valid, and domains related to feedback being set to be invalid. For example, the domains related to feedback in the DCI are set to be all "0" or all "1" or a predetermined value to indicate that a current domain is invalid, and the UE may be ignored. For example, the domains related to feedback may include a time for the target UE to perform feedback, and an uplink PUCCH resource used for performing feedback, etc.

For example, it may be achieved in the following two specific methods:

method 1:
i. the DCI transmitted by the network equipment to the source UE (first user equipment) is scrambled with an RNTI of the source UE, the DCI containing an ID of the target UE (second user equipment); and the DCI transmitted to the target UE is scrambled with an RNTI of the target UE, the DCI containing an ID of the source UE (second user equipment); or, both the DCI transmitted to the source UE and the DCI transmitted to the target UE are scrambled with a pair/link RNTI, no ID needing to be contained in both of the DCI; and ii. on the basis of step i, 1 bit is contained in the DCI to indicate whether the UE currently receiving the DCI is the source UE or the target UE, and for the method in which the DCI contains the ID, the 1 bit also indicates whether an ID field corresponds to the source UE or the target UE; in particular, if it is the source UE, the ID field corresponds to the target UE; otherwise, the ID field corresponds to the source UE; for the pair/link RNTI method, the DCI does not need to include any UE ID. Then, two UEs may learn which is the source UE and which is the target UE by decoding their respective DCI. For the source UE, this DCI is used for data scheduling, and the domain related to feedback is invalid; and for the target UE, this DCI is used for indicating feedback information, and the domain related to scheduling is invalid.

method 2:
a pair or link ID is used to scramble, and the same PDCCH is transmitted to the source UE and the target UE, and the DCI contains IDs of the source UE and the target UE respectively, and contains a distinguishing indicator bit, and at the same time, a scheduled domain and an HARQ feedback related domain need to be contained. Hence, a PDCCH signaling resource may be saved.

In the above method 1 and method 2, SCI indication information in the sidelink control channel PSCCH does not need to include a field related to indicating that the target UE performs feedback.

In this embodiment, the indication information related to transmission of feedback information may include a time for transmitting the feedback information of sidelink transmission and/or a resource used for transmitting the feedback information of sidelink transmission, so that the second user equipment transmits the feedback information at this time and/or on this resource.

In this embodiment, the time for transmitting the feedback information of sidelink transmission may not be contained in the indication information related to transmission of feedback information, for example, the time is predefined, or is preconfigured.

In this embodiment, for example, the time for transmitting the feedback information of sidelink transmission is:
- a first time after a last symbol of a physical downlink control channel (PDCCH) carrying the indication information related to transmission of feedback information received from the first user equipment or the network device or a last symbol of a slot where the physical downlink control channel is located, or a second time after a last symbol of a physical sidelink shared channel (PSSCH) carrying sidelink-transmitted data received from the first user equipment or a last symbol of a slot where the physical sidelink shared channel is located.

The case where the method is applied to the second user equipment side (the target UE side) is described above. The case where the method is applied to the first user equipment side (the source UE side) shall be described below.

Figure 5:
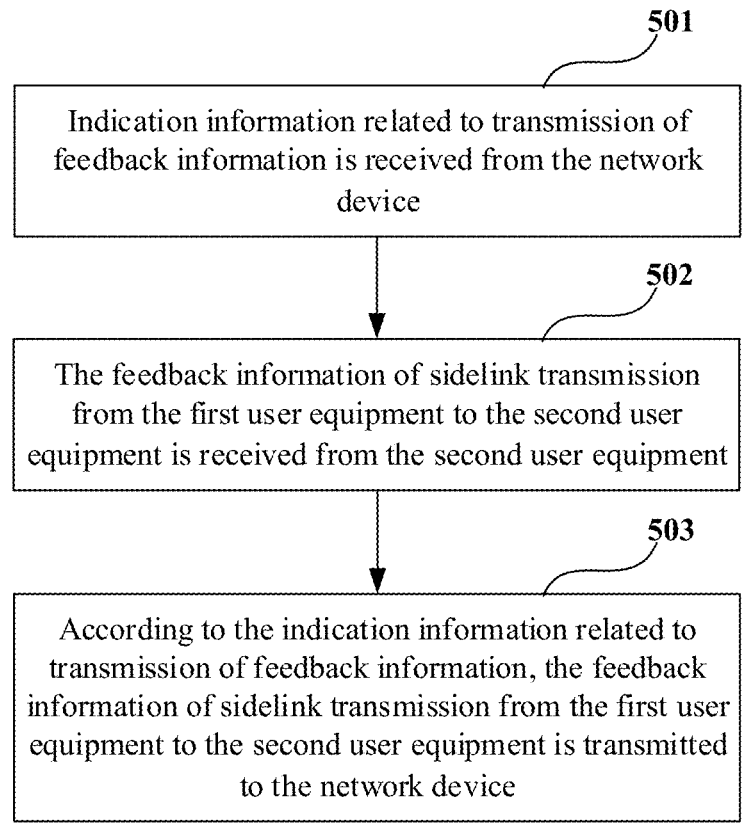
FIG. 5 is yet another schematic diagram of the transmission method of feedback information of Embodiment 1 of this disclosure.
Figure 6:
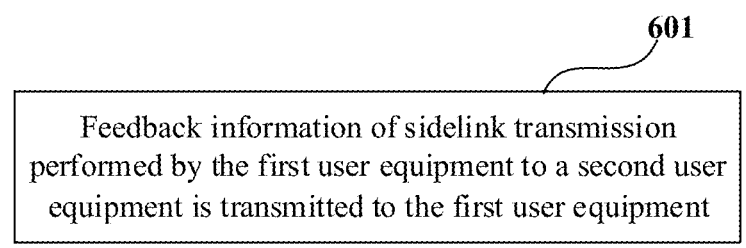
FIG. 6 is still another schematic diagram of the transmission method of feedback information of Embodiment 1 of this disclosure.

For example, the methods shown in FIGS. 5 and 6 may either be applied in a scenario where the second user equipment is not under the coverage of the cell where the first user equipment is located, or may be applied in a scenario where the second user equipment is under the coverage of the cell where the first user equipment is located.

FIG. 5 is yet another schematic diagram of the transmission method of feedback information of Embodiment 1 of this disclosure, which is applied to the first user equipment side. As shown in FIG. 5, the method includes:
- Step 501: indication information related to transmission of feedback information is received from the network device;
- Step 502: the feedback information of sidelink transmission from the first user equipment to the second user equipment is received from the second user equipment; and
- Step 503: according to the indication information related to transmission of feedback information, the feedback information of sidelink transmission from the first user equipment to the second user equipment is transmitted to the network device.

In step 501, the indication information related to transmission of feedback information is received via a physical downlink control channel (PDCCH).

In this embodiment, the indication information related to transmission of feedback information includes a time for transmitting the feedback information of sidelink transmission and/or a resource used for transmitting the feedback information of sidelink transmission.

In this embodiment, for example, the time for transmitting the feedback information of sidelink transmission is:
- a third time after a last symbol of a PDCCH carrying the indication information related to transmission of feedback information received from the network device or a last symbol of a slot where the PDCCH is located, or,
- a fourth time after a last symbol of a PSSCH carrying sidelink-transmitted data transmitted to the second user equipment or a last symbol of a slot where the PSSCH is located.

FIG. 6 is still another schematic diagram of the transmission method of feedback information of Embodiment 1 of this disclosure, which is applied to the second user equipment side. As shown in FIG. 6, the method includes:
- Step 601: feedback information of sidelink transmission performed by the first user equipment to a second user equipment is transmitted to the first user equipment.

In this embodiment, the second user equipment may transmit the feedback information to the first user equipment when a suitable resource is found. An occasion of the transmission is not limited in the embodiment of this disclosure.

It can be seen from the above embodiment that the user equipment receives or generates sidelink feedback information and transmits the sidelink feedback information to the network device, thereby providing a feedback mechanism for sidelink transmission, which may improve reliability of data transmission of the sidelink.

Embodiment 2

Figure 7:
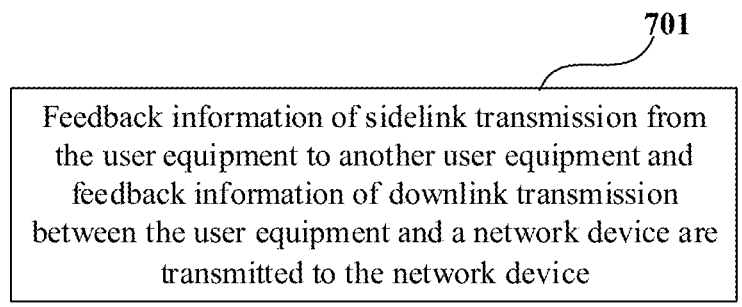
FIG. 7 is a schematic diagram of the transmission method of feedback information of Embodiment 2 of this disclosure.

The embodiment of this disclosure provides a transmission method of feedback information, applied to a user equipment side. FIG. 7 is a schematic diagram of the transmission method of feedback information of Embodiment 2 of this disclosure. As shown in FIG. 7, the method includes:
- Step 701: feedback information of sidelink transmission from the user equipment to another user equipment and feedback information of downlink transmission between the user equipment and a network device are transmitted to the network device.

In this embodiment, sidelink transmission may be performed between the user equipment and the other user equipment. The user equipment is a source UE and the other user equipment is a target UE. Hence, the sidelink transmission is sidelink transmission from the user equipment to the other user equipment.

In this embodiment, the feedback information of sidelink transmission and the feedback information of downlink transmission are transmitted on identical or different resources.

For example, the feedback information of sidelink transmission is transmitted via a first resource indicated by a first physical downlink control channel scheduling sidelink transmission, and the feedback information of downlink transmission is transmitted via a second resource indicated by a second physical downlink control channel scheduling downlink transmission, and the first resource and the second resource may be identical or different.

For example, the PUCCH resource used for transmitting the feedback information may be a resource indicated in DCI carried in a PDCCH scheduling DL, or a resource indicated in DCI carried in a PDCCH scheduling sidelink transmission, or it may be dependent on whether PUCCH resources indicated by them are identical, if they are identical, the DL and sidelink transmission are fed back in identical PUCCH resources, and if they are different, they are fed back in PUCCH resources indicated in DCI respectively scheduled by them. And at the same time, a DAI field needs to be added to the DCI scheduling the sidelink transmission for performing feedback.

The case where the feedback information of sidelink transmission and the feedback information of downlink transmission are transmitted on identical resources shall be first described below.

In this embodiment, in step 701, it may be that feedback information combined by the feedback information of sidelink transmission and the feedback information of downlink transmission is transmitted to the network device.

For example, the combined feedback information includes:
- feedback codewords formed by ranking and cascading feedback results in a predetermined order of carriers of the downlink transmission and carriers of the sidelink transmission first and then in an order of transmission occasions, the predetermined order being that the carriers of the downlink transmission are in the front and the carriers of the sidelink transmission are at the back, or the carriers of the sidelink transmission are in the front and the carriers of the downlink transmission are at the back, or feedback codewords formed by cascading first feedback codewords formed by ranking and cascading feedback results in an order of carriers of the downlink transmission and then in an order of transmission occasions and second feedback codewords formed by ranking and cascading the feedback results in an order of carriers of the sidelink transmission and then in an order of the transmission occasions; for example, the first feedback codewords are in front of the second feedback codewords, or the first feedback codewords are behind the second feedback codewords.

Figure 8:
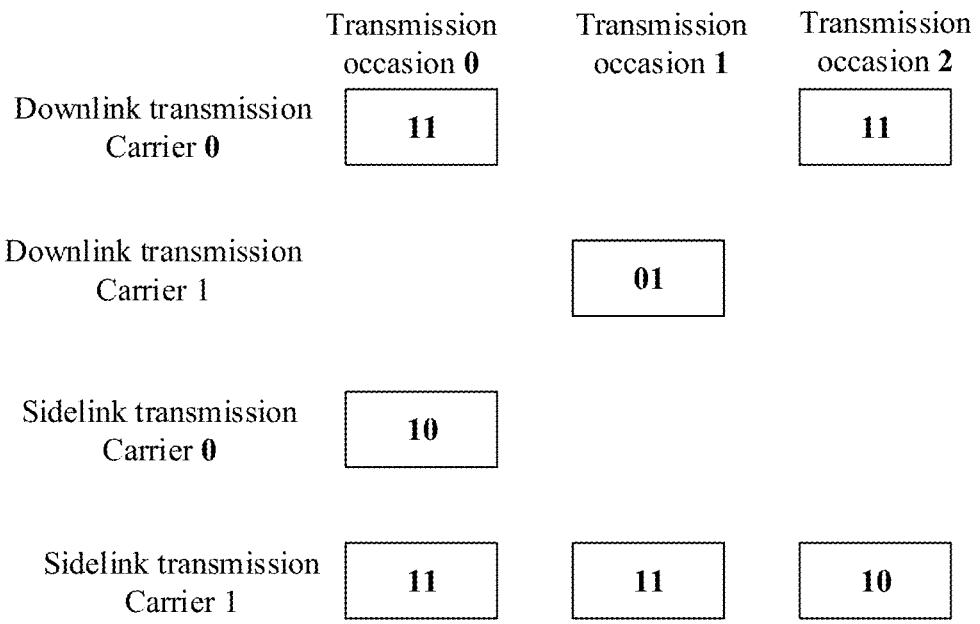
FIG. 8 is a schematic diagram of feedback results of transmission opportunities to which carriers of downlink transmission and carriers of sidelink transmission correspond of Embodiment 2 of this disclosure.

FIG. 8 is a schematic diagram of feedback results of transmission opportunities to which carriers of downlink transmission and carriers of sidelink transmission correspond of Embodiment 2 of this disclosure. As shown in FIG. 8, downlink transmission is configured with a carrier 0 and a carrier 1, the sidelink transmission is configured with a carrier 0 and a carrier 1, and a transmission occasion 0, a transmission occasion 1 and a part of a transmission occasion 2 corresponding to these carriers have feedback results, which may be expressed as "00", "01", "10" or "11", assuming that transmission of two TBs is supported, 00 represents that on a corresponding carrier of a corresponding occasion, both of the TBs are not decoded correctly, and 01 represents that TB0 is not decoded correctly and TB1 is decoded correctly, and so on.

For example, in combining the feedback information of sidelink transmission and the feedback information of downlink transmission, the feedback codewords formed by ranking and cascading feedback results in the order of carriers of the downlink transmission in the front and carriers of the sidelink transmission at the back first and then in the order of transmission occasions are taken as the combined feedback information, for example, for the feedback results shown in FIG. 8, the feedback codewords formed by ranking and cascading are "11101101111110";

for another example, in combining the feedback information of sidelink transmission and the feedback information of downlink transmission, the feedback codewords formed by ranking and cascading feedback results in the order of carriers of the sidelink transmission in the front and carriers of the downlink transmission at the back first and then in the order of transmission occasions are taken as the combined feedback information, for example, for the feedback results shown in FIG. 8, the feedback codewords formed by ranking and cascading are "10111111011011";

for a further example, in combining the feedback information of sidelink transmission and the feedback information of downlink transmission, feedback codewords formed by ranking and cascading feedback codewords formed by a first feedback codeword and a second feedback codeword are taken as the combined feedback information, the first feedback codeword being formed by ranking and cascading feedback results in the order of carriers of the downlink transmission and carriers of the sidelink transmission first and then in the order of transmission occasions, and the second feedback codeword being formed by ranking and cascading feedback results in the order of carriers of the sidelink transmission and carriers of the downlink transmission first and then in the order of transmission occasions, for example, the first feedback codeword is in front of the second feedback codeword; for example, for the feedback results shown in FIG. 8, the feedback codewords formed by ranking and cascading in this ordering manner are "11011110111110";

for yet another example, in combining the feedback information of sidelink transmission and the feedback information of downlink transmission, feedback codewords formed by ranking and cascading feedback codewords formed by a first feedback codeword and a second feedback codeword are taken as the combined feedback information, the first feedback codeword being formed by ranking and cascading feedback results in the order of carriers of the downlink transmission first and then in the order of transmission occasions, and the second feedback codeword being formed by ranking and cascading feedback results in the order of carriers of the sidelink transmission first and then in the order of transmission occasions, for example, the first feedback codeword is behind the second feedback codeword; for example, for the feedback results shown in FIG. 8, the feedback codewords formed by ranking and cascading in this ordering manner are "10111110110111".

In this embodiment, the feedback information of the side link transmission and the feedback information of the downlink transmission may also be transmitted on different resources.

For example, the feedback information of the side link transmission and the feedback information of the downlink transmission are transmitted in different PUCCH resources.

It may also be applicable to a case where the indicated PUCCH resources for transmitting the feedback information of the side link transmission and the feedback information of the downlink transmission are different. For example, the feedback information of the downlink transmission is transmitted in a resource carrying indication in a PDCCH scheduling the downlink transmission, and feedback information of the sidelink transmission is transmitted in a resource carrying indication in a PDCCH scheduling the sidelink transmission.

It can be seen from the above embodiment that the user equipment transmits the sidelink feedback information to the network device, thereby providing a feedback mechanism for sidelink transmission, which may improve reliability of data transmission of the sidelink. Furthermore, a feedback mechanism for the case of presence of feedback information of downlink transmission and feedback information of sidelink transmission is provided.

Embodiment 3

The embodiment of this disclosure provides a transmission method of feedback information, applied to a first user equipment (a source UE) side.

Figure 9:
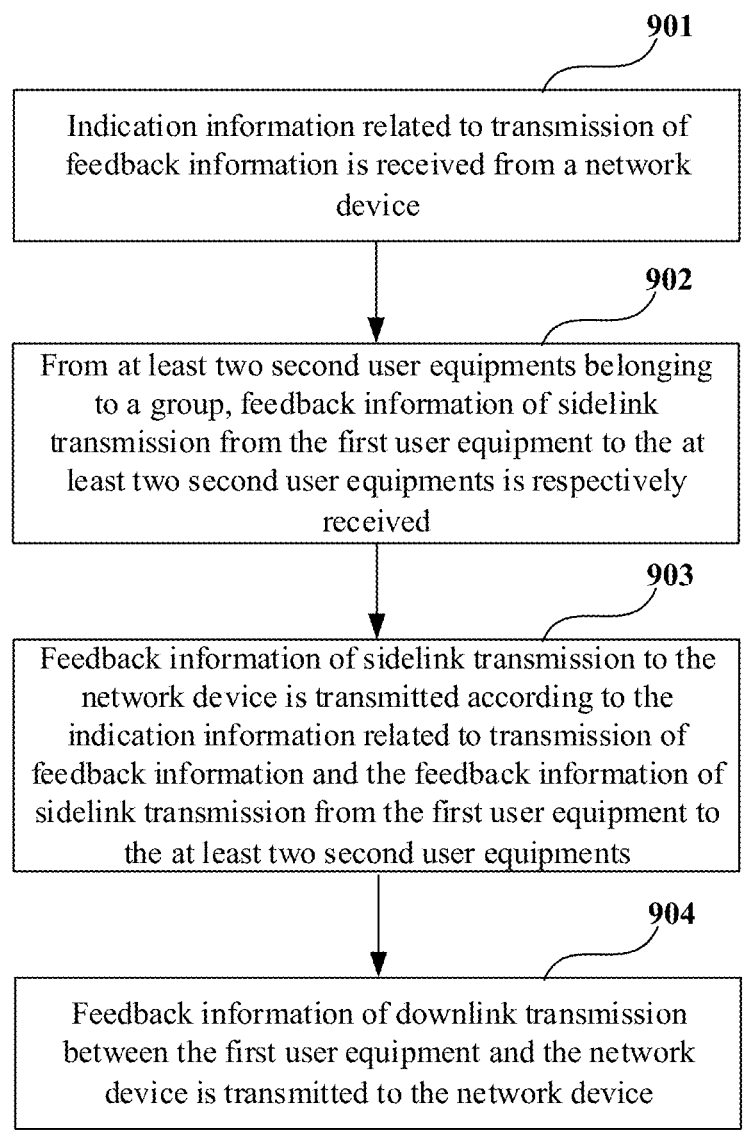
FIG. 9 is a schematic diagram of the transmission method of feedback information of Embodiment 3 of this disclosure.

FIG. 9 is a schematic diagram of the transmission method of feedback information of Embodiment 3 of this disclosure. As shown in FIG. 9, the method includes:

Step 901: indication information related to transmission of feedback information is received from a network device;

Step 902: from at least two second user equipments belonging to a group, feedback information of sidelink transmission from the first user equipment to the at least two second user equipments is respectively received; and Step 903: feedback information of sidelink transmission to the network device is transmitted according to the indication information related to transmission of feedback information and the feedback information of sidelink transmission from the first user equipment to the at least two second user equipments.

In this embodiment, the first user equipment (source UE) and the at least two second user equipments (target UEs) form a group, and the first user equipment (source UE) performs sidelink transmission to the at least two second user equipments (target UEs) forming a group in a groupcast mode.

In step 901, the indication information related to transmission of feedback information may be received via a physical downlink control channel (PDCCH).

In this embodiment, the indication information related to transmission of feedback information may include a time for transmitting the feedback information of sidelink transmission and/or a resource used for transmitting the feedback information of sidelink transmission.

For example, the time for transmitting the feedback information of sidelink transmission is:
a third time after a last symbol of a PDCCH carrying the indication information related to transmission of feedback information received from a network device or a last symbol of a slot where the PDCCH is located from the network device, or, a fourth time after a last symbol of a PSSCH carrying sidelink-transmitted data transmitted to the at least two second user equipments or a last symbol of a slot where the PSSCH is located.

In this embodiment, the feedback information of sidelink transmission transmitted to the network device may include: feedback codewords formed by cascading at least two feedback codewords of sidelink transmissions from the first user equipment to the at least two second user equipments respectively received from the at least two second user equipments. For example, the first user equipment and the at least two second user equipments form a group, and each user equipment has a sequence number. For example, when IDs representing their sequence numbers are 0, 1, . . . , n−1, the group has total n user equipments. Feedback codewords of each second user equipment may be cascaded in an order of IDs of the second user equipments. For example, the order may be IDs from small to large, or may be IDs from large to small.

As groupcast is a one-to-many scheduling, and is one time of transmission in which the same PDCCH schedules multiple UEs, and for all second user equipments (target UEs) in the group, whether to transmit within a transmission occasion and indices of subcarriers used in the transmission are all identical, for the target UEs in the group, numbers of bits needing to be fed back within each time of feedback are identical. Therefore, it is known to the network device which bits in the feedback codewords fed back by the source UE correspond to feedback information of which target UE, without causing confusion.

In this embodiment, alternatively, the feedback information of the sidelink transmission transmitted to the network device may further include: feedback codewords formed by cascading feedback results in a predetermined order of carriers of sidelink transmissions from the first user equipment to the at least two second user equipments and then in an order of transmission occasions, the predetermined order being an order of sequence numbers of the at least two second user equipments. For example, the order may be sequence numbers from small to large, or may be sequence numbers from large to small.

FIG. 10 is a schematic diagram of feedback results of transmission opportunities to which carriers of configuration of sidelink transmission from a first user equipment to at least two second user equipments correspond of Embodiment 3 of this disclosure. As shown in FIG. 10, three second user equipments, UE0, UE1 and UE2, belong to a group, sidelink transmissions from the first user equipment to the three second user equipments are all configured with carrier 0 and carrier 1, and a part of transmission occasion 0, transmission occasion 1 and transmission occasion 2 corresponding to these carriers have feedback results, which are represented as "00", "01", "10" or "11".

For example, for the feedback results shown in FIG. 10, feedback codewords formed by cascading the feedback results in the predetermined order of carriers of sidelink transmissions from the first user equipment to the at least two user equipments (sequence numbers of the second user equipment from large to small) and then in the order of transmission occasions are "110101101111111100001".

In step 903, the feedback information of the sidelink transmission is transmitted to the network device according to the indication information related to transmission of feedback information and the feedback information of sidelink transmissions from the first user equipment to the at least two second user equipments.

Figure 11:
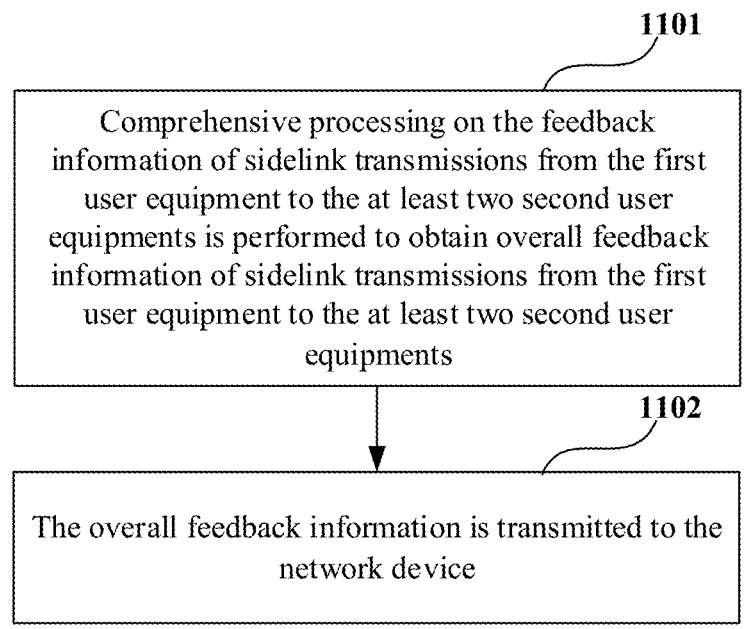
FIG. 11 is a schematic diagram of implementation of step 903 of Embodiment 3 of this disclosure.

FIG. 11 is a schematic diagram of implementation of step 903 of Embodiment 3 of this disclosure. As shown in FIG. 11, the method includes:
Step 1101: comprehensive processing on the feedback information of sidelink transmissions from the first user equipment to the at least two second user equipments is performed to obtain overall feedback information of sidelink transmissions from the first user equipment to the at least two second user equipments; and
Step 1102: the overall feedback information is transmitted to the network device.

For example, the comprehensive processing is a logic "and" computing process.

For example, when feedback results of 4 second user equipments (target UEs) belonging to one group are {1,1,1,1}, the first user equipment (source UE) feeds back {1} to the network device; and when feedback results of the 4 second user equipments are {1,0,1,1}, the first user equipment feeds back {0} to the network device. For example, 1 means "correct" and 0 means "wrong".

In this embodiment, the method may further include:
Step 904: feedback information of downlink transmission between the first user equipment and the network device is transmitted to the network device.

In this embodiment, the feedback information of sidelink transmission and the feedback information of downlink transmission are transmitted on identical or different resources.

In this embodiment, step 904 is optional.

In this embodiment, step 904 and step 903 may be executed separately, and an order of their execution is not limited. In addition, step 904 and step 903 may also be executed in a combined manner, such as transmitting feedback information obtained by combining the feedback information of sidelink transmission and the feedback information of downlink transmission to the network device.

In this embodiment, when the feedback information of the downlink transmission and the feedback information of the sidelink transmission need to be transmitted, reference may be made to what is contained in Embodiment 2 for a particular transmission method thereof, which shall not be described herein any further.

It can be seen from the above embodiment that target UEs belonging to a group transmit sidelink feedback information to the network device via the source UE, thereby providing a feedback mechanism of sidelink transmission in a groupcast form, and improving reliability of data transmission of a sidelink.

Embodiment 4

The embodiment of this disclosure provides a transmission method of feedback information, applied to a network device side. This method corresponds to the methods described in Embodiment 1 and Embodiment 2 that are applied to user equipment sides.

Figure 12:
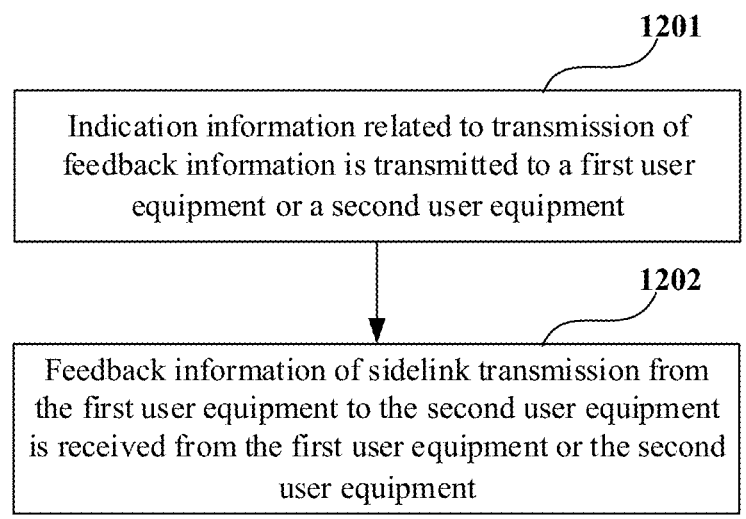
FIG. 12 is a schematic diagram of the transmission method of feedback information of Embodiment 4 of this disclosure.

FIG. 12 is a schematic diagram of the transmission method of feedback information of Embodiment 4 of this disclosure. As shown in FIG. 12, the method includes:

Step 1201: indication information related to transmission of feedback information is transmitted to a first user equipment or a second user equipment; and Step 1202: feedback information of sidelink transmission from the first user equipment to the second user equipment is received from the first user equipment or the second user equipment.

In step 1201, the indication information related to transmission of feedback information may be transmitted via a physical downlink control channel (PDCCH).

In this embodiment, sidelink transmission may be performed between the first user equipment and the second user equipment, the first user equipment is a source UE, the second user equipment is a target UE, and the sidelink transmission is sidelink transmission from the first user equipment to the second user equipment.

In this embodiment, reference may be made to what is described in Embodiment 1 and Embodiment 2 for a method for transmitting the indication information related to transmission of feedback information, which shall not be described herein any further.

Figure 13:
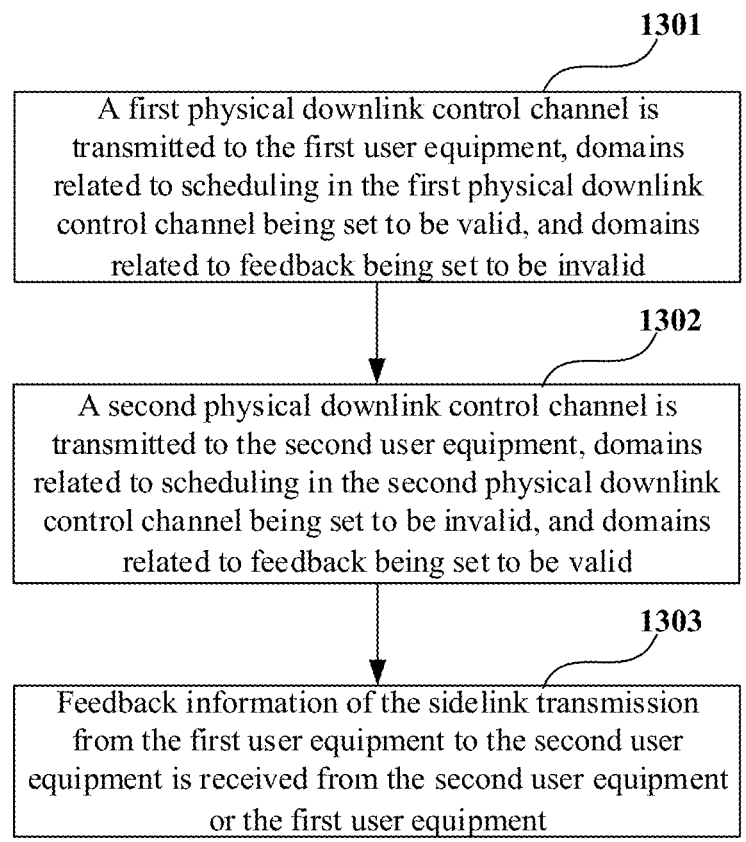
FIG. 13 is another schematic diagram of the transmission method of feedback information of Embodiment 4 of this disclosure.

FIG. 13 is another schematic diagram of the transmission method of feedback information of Embodiment 4 of this disclosure. As shown in FIG. 13, the method includes:

Step 1301: a first physical downlink control channel is transmitted to the first user equipment, domains related to scheduling in the first physical downlink control channel being set to be valid, and domains related to feedback being set to be invalid;

Step 1302: a second physical downlink control channel is transmitted to the second user equipment, domains related to scheduling in the second physical downlink control channel being set to be invalid, and domains related to feedback being set to be valid; and Step 1303: feedback information of the sidelink transmission from the first user equipment to the second user equipment is received from the second user equipment or the first user equipment.

In this embodiment, step 1301 and step 1302 may be executed sequentially, or may be executed simultaneously, and an order of execution is not limited in this embodiment.

In this embodiment, reference may be made to what is described in Embodiment 1 for particular implementations of steps 1301-1303, which shall not be described herein any further.

It can be seen from the above that the user equipment transmits the sidelink feedback information to the network device, thereby providing a feedback mechanism of sidelink transmission, and improving reliability of data transmission of a sidelink.

Embodiment 5

The embodiment of this disclosure provides a transmission method of feedback information, applied to a network device side. This method corresponds to the transmission method of feedback information described in Embodiment 3 that is applied to a user equipment side.

Figure 14:
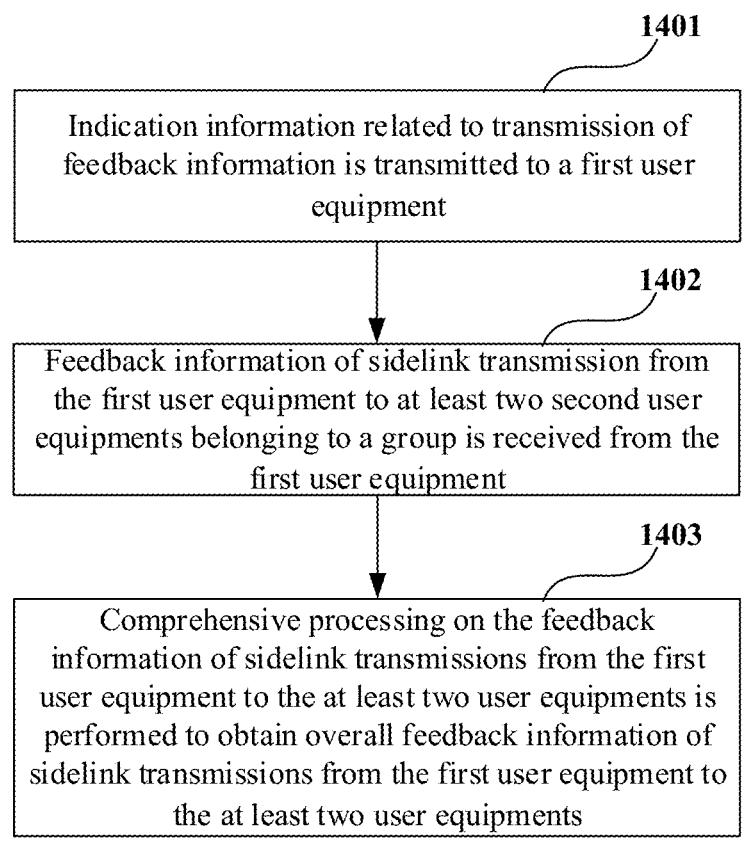
FIG. 14 is a schematic diagram of the transmission method of feedback information of Embodiment 5 of this disclosure.

FIG. 14 is a schematic diagram of the transmission method of feedback information of Embodiment 5 of this disclosure. As shown in FIG. 14, the method includes:

Step 1401: indication information related to transmission of feedback information is transmitted to a first user equipment; and Step 1402: feedback information of sidelink transmission from the first user equipment to at least two second user equipments belonging to a group is received from the first user equipment.

In this embodiment, the at least two second user equipments form a group, and the first user equipment (source UE) performs sidelink transmission to the at least two second user equipments (target UEs) forming a group in a groupcast mode.

In this embodiment, reference may be made to what is described in Embodiment 3 for particular implementations of steps 1401 and step 1402, which shall not be described herein any further.

In this embodiment, the method may further include:

Step 1403: comprehensive processing on the received feedback information of sidelink transmissions from the first user equipment to the at least two second user equipments is performed to obtain overall feedback information of sidelink transmissions from the first user equipment to the at least two second user equipments.

In this embodiment, step 1403 is optional.

That is, the comprehensive processing on the feedback information of sidelink transmissions from the first user equipment (source UE) to the at least two second user equipments may not be performed by the first user equipment, and may be performed by the network device. Reference may be made to what is described in Embodiment 3 for a method for performing comprehensive processing by the network device, which shall not be described herein any further.

It can be seen from the above embodiment that target UEs belonging to a group transmit sidelink feedback information to the network device via the source UE, thereby providing a feedback mechanism of sidelink transmission in a groupcast form, and improving reliability of data transmission of a sidelink.

Embodiment 6

The embodiment of this disclosure provides a transmission method of feedback information, applied to a user equipment side and a network device side. This method corresponds to the transmission method of feedback information described in Embodiment 1 that is applied to a user equipment side and the transmission method of feedback information described in Embodiment 4 that is applied to a network device side.

Figure 15:
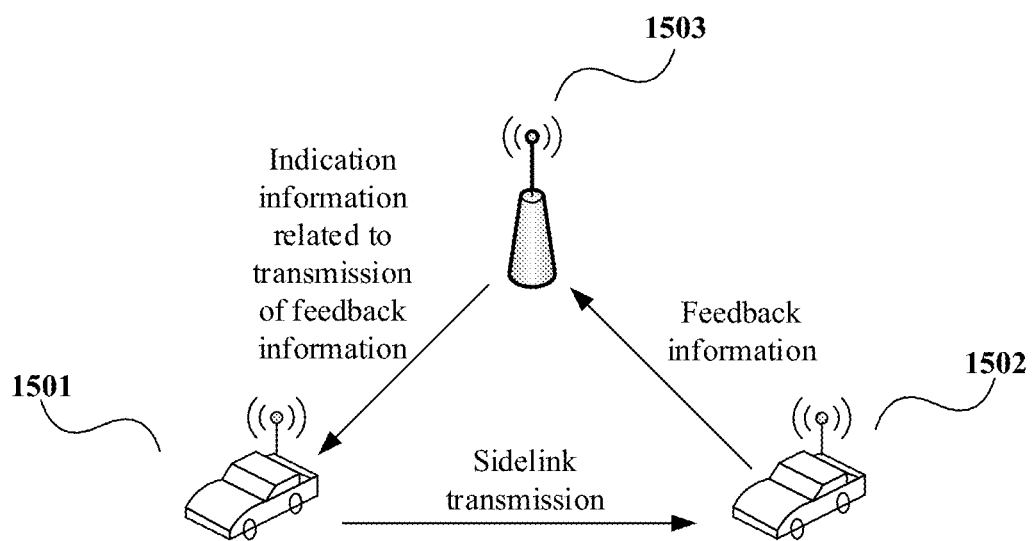
FIG. 15 is a schematic diagram of an application scenario of Embodiment 6 of this disclosure.

FIG. 15 is a schematic diagram of an application scenario of Embodiment 6 of this disclosure. As shown in FIG. 15, a first user equipment 1501 taken as a source UE transmits data to a second user equipment 1502 taken as a target UE for performing sidelink transmission. The second user equipment 1502 is under coverage of a cell where the first user equipment 1501 is located, the cell being served by a network device 1503. The network device 1503 transmits to the first user equipment 1501 feedback information of sidelink transmission, and the second user equipment 1502 transmits to the network device 1503 feedback information of sidelink transmission from the first user equipment to the second user equipment.

Figure 16:
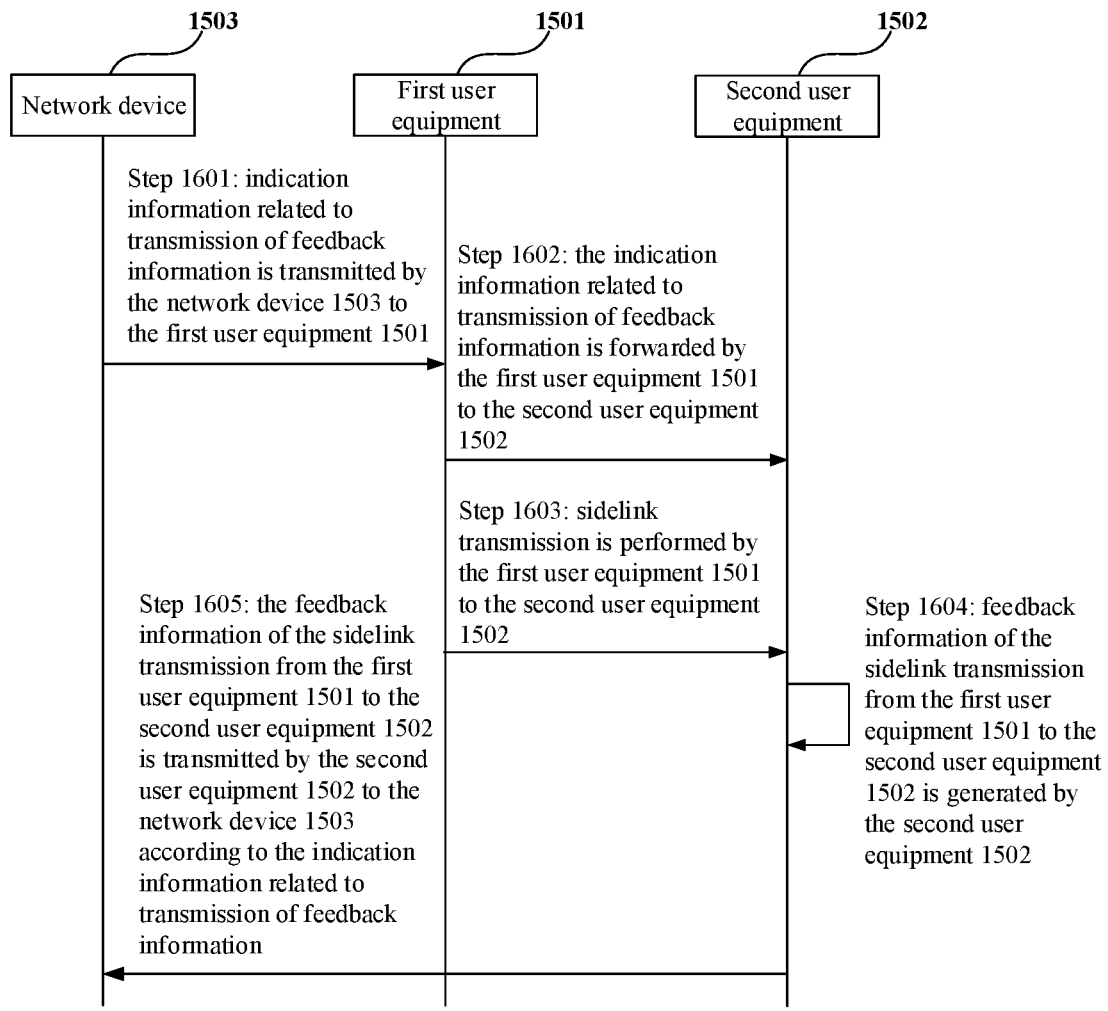
FIG. 16 is a schematic diagram of the transmission method of feedback information of Embodiment 6 of this disclosure.

FIG. 16 is a schematic diagram of the transmission method of feedback information of Embodiment 6 of this disclosure. As shown in FIG. 16, the method includes:

Step 1601: indication information related to transmission of feedback information is transmitted by the network device 1503 to the first user equipment 1501;

Step 1602: the indication information related to transmission of feedback information is forwarded by the first user equipment 1501 to the second user equipment 1502;

Step 1603: sidelink transmission is performed by the first user equipment 1501 to the second user equipment 1502;

Step 1604: feedback information of the sidelink transmission from the first user equipment 1501 to the second user equipment 1502 is generated by the second user equipment 1502; and Step 1605: the feedback information of the sidelink transmission from the first user equipment 1501 to the second user equipment 1502 is transmitted by the second user equipment 1502 to the network device 1503 according to the indication information related to transmission of feedback information.

In this embodiment, reference may be made to what are described in Embodiment 1 and Embodiment 4 for particular implementations of the above steps, which shall not be described herein any further.

In this embodiment, for example, as the first user equipment 1501 needs a period of time for data processing and packet grouping, a feedback time indicated by the first user equipment 1501 to the second user equipment 1502 in step 1602 may be less than a feedback time indicated by the network device 1503 to the first user equipment 1501 in step 1601.

It can be seen from the above embodiment that the second user equipment generates sidelink feedback information and transmits the sidelink feedback information to the network device, thereby providing a feedback mechanism of sidelink transmission in a groupcast form, and improving reliability of data transmission of a sidelink.

Embodiment 7

The embodiment of this disclosure provides a transmission method of feedback information, applied to a user equipment side and a network device side. This method corresponds to the transmission method of feedback information described in Embodiment 1 that is applied to a user equipment side and the transmission method of feedback information described in Embodiment 4 that is applied to a network device side.

Figure 17:
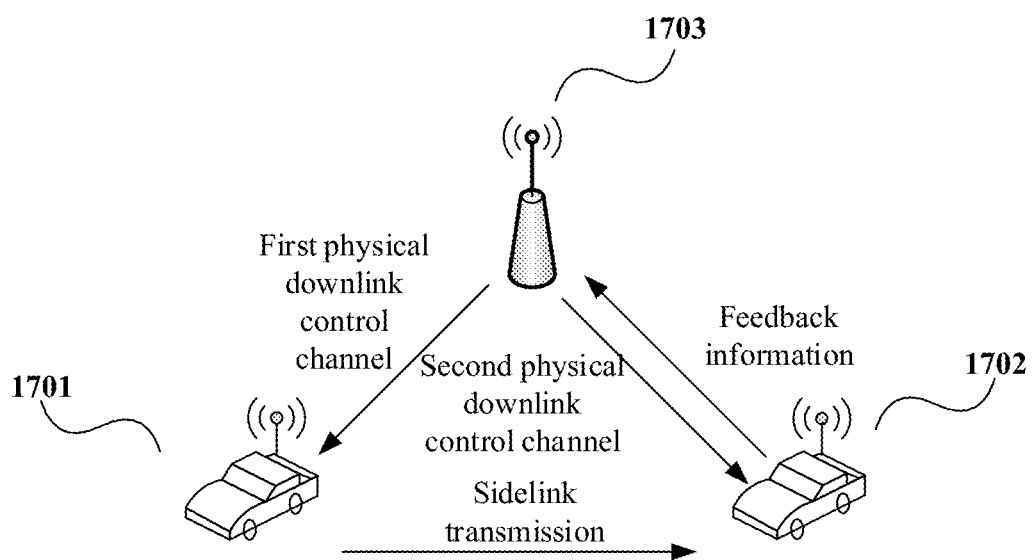
FIG. 17 is a schematic diagram of an application scenario of Embodiment 7 of this disclosure.

FIG. 17 is a schematic diagram of an application scenario of Embodiment 7 of this disclosure. As shown in FIG. 17, a first user equipment 1701 taken as a source UE transmits data to a second user equipment 1702 taken as a target UE for performing sidelink transmission. The second user equipment 1702 is under coverage of a cell where the first user equipment 1701 is located, the cell being served by a network device 1703. The network device 1703 transmits a first physical downlink control channel to the first user equipment 1701 and a second physical downlink control channel to the second user equipment 1702, and the second user equipment 1702 transmits to the network device 1703 feedback information of sidelink transmission from the first user equipment to the second user equipment.

Figure 18:
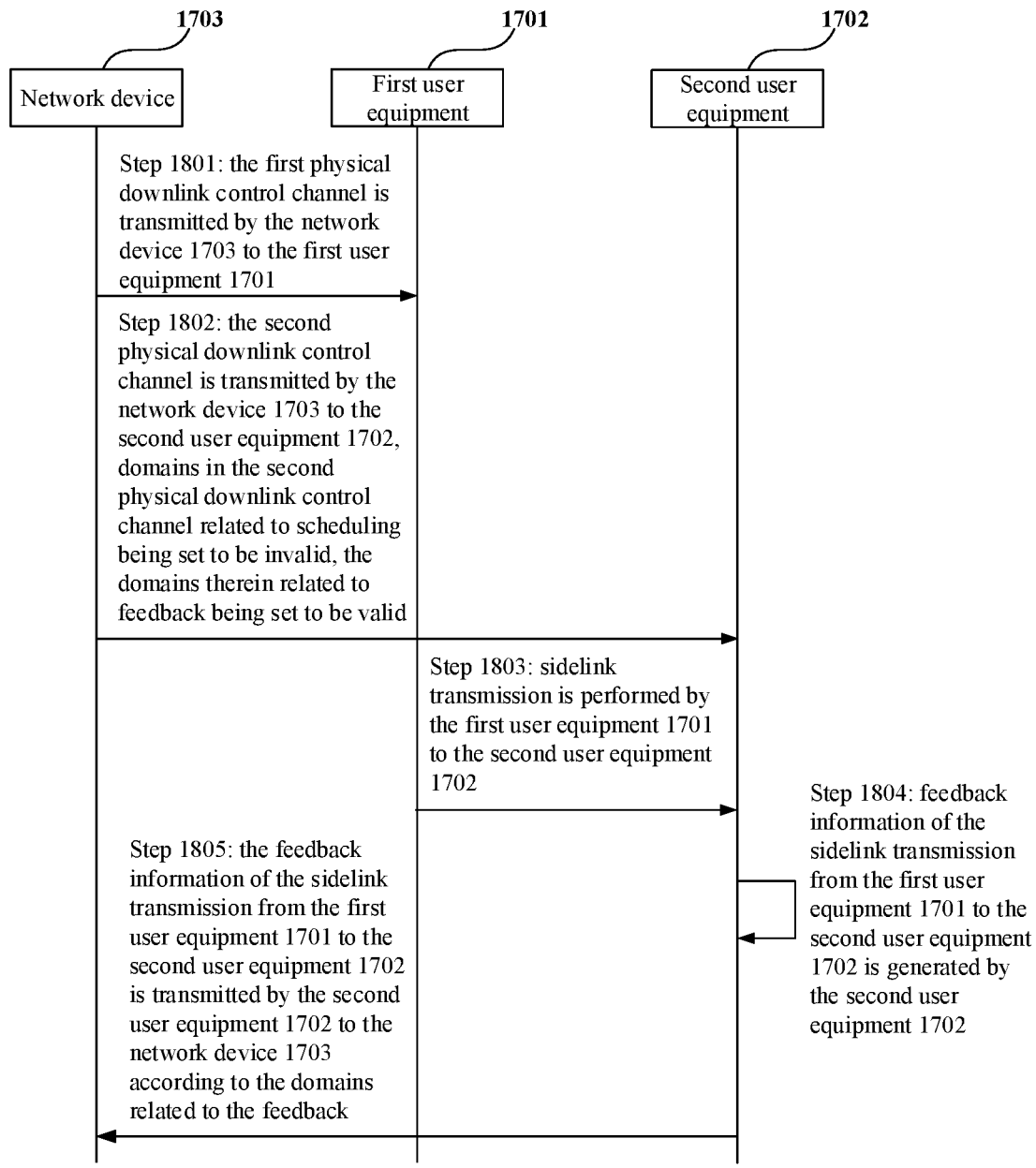
FIG. 18 is a schematic diagram of the transmission method of feedback information of Embodiment 7 of this disclosure.

FIG. 18 is a schematic diagram of the transmission method of feedback information of Embodiment 7 of this disclosure. As shown in FIG. 18, the method includes:

Step 1801: the first physical downlink control channel is transmitted by the network device 1703 to the first user equipment 1701, domains in the first physical downlink control channel related to scheduling being set to be valid, domains therein related to feedback being set to be invalid;

Step 1802: the second physical downlink control channel is transmitted by the network device 1703 to the second user equipment 1702, domains in the second physical downlink control channel related to scheduling being set to be invalid, domains therein related to feedback being set to be valid;

Step 1803: sidelink transmission is performed by the first user equipment 1701 to the second user equipment 1702;

Step 1804: feedback information of the sidelink transmission from the first user equipment 1701 to the second user equipment 1702 is generated by the second user equipment 1702; and Step 1805: the feedback information of the sidelink transmission from the first user equipment 1701 to the second user equipment 1702 is transmitted by the second user equipment 1702 to the network device 1703 according to the domains related to the feedback.

In this embodiment, step 1801 and step 1802 may be executed sequentially, or may be executed simultaneously.

In this embodiment, reference may be made to what are described in Embodiment 1 and Embodiment 4 for particular implementations of the above steps, which shall not be described herein any further.

It can be seen from the above embodiment that the second user equipment generates sidelink feedback information and transmits the sidelink feedback information to the network device, thereby providing a feedback mechanism of sidelink transmission in a groupcast form, and improving reliability of data transmission of a sidelink. Furthermore, SCI indication information in the sidelink control channel PSCCH does not need to include a field related to indicating that the target UE performs feedback.

Embodiment 8

The embodiment of this disclosure provides a transmission method of feedback information, applied to a user equipment side and a network device side. This method corresponds to the transmission method of feedback information described in Embodiment 1 that is applied to a user equipment side and the transmission method of feedback information described in Embodiment 4 that is applied to a network device side.

Figure 19:
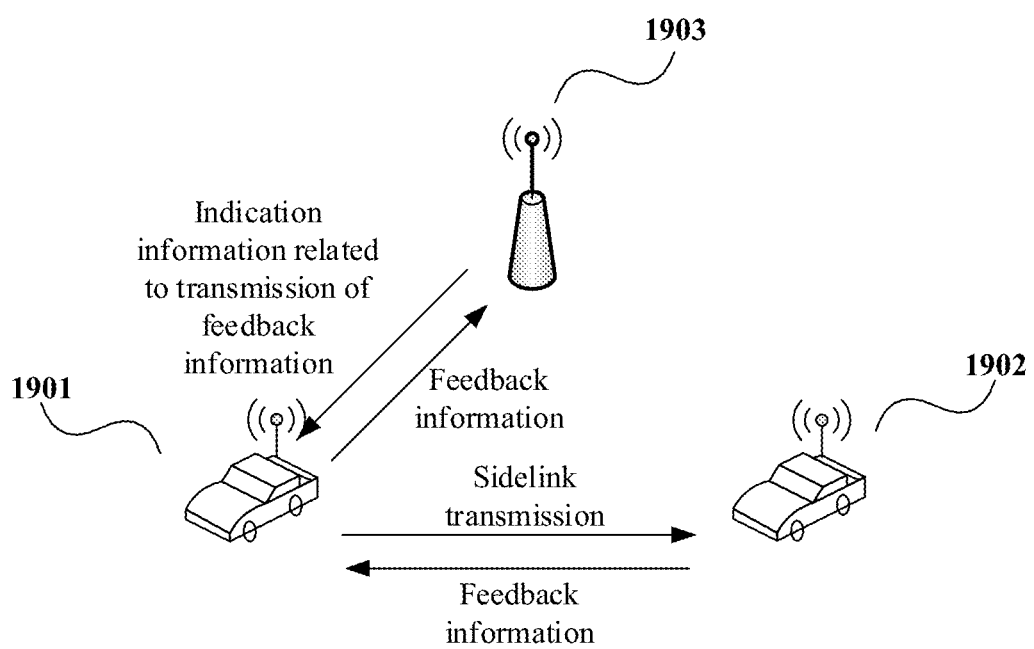
FIG. 19 is a schematic diagram of an application scenario of Embodiment 8 of this disclosure.

FIG. 19 is a schematic diagram of an application scenario of Embodiment 8 of this disclosure. As shown in FIG. 19, a first user equipment 1901 taken as a source UE transmits data to a second user equipment 1902 taken as a target UE for performing sidelink transmission. The second user equipment 1902 may be either under coverage of a cell where the first user equipment 1901 is located, or out of the coverage, the cell being served by a network device 1903. The network device 1903 transmits indication information related to transmission of feedback information to the first user equipment 1901, and the first user equipment 1901 receives from the second user equipment 1902 feedback information of sidelink transmission from the first user equipment to the second user equipment and transmits the feedback information to the network device 1903.

Figure 20:
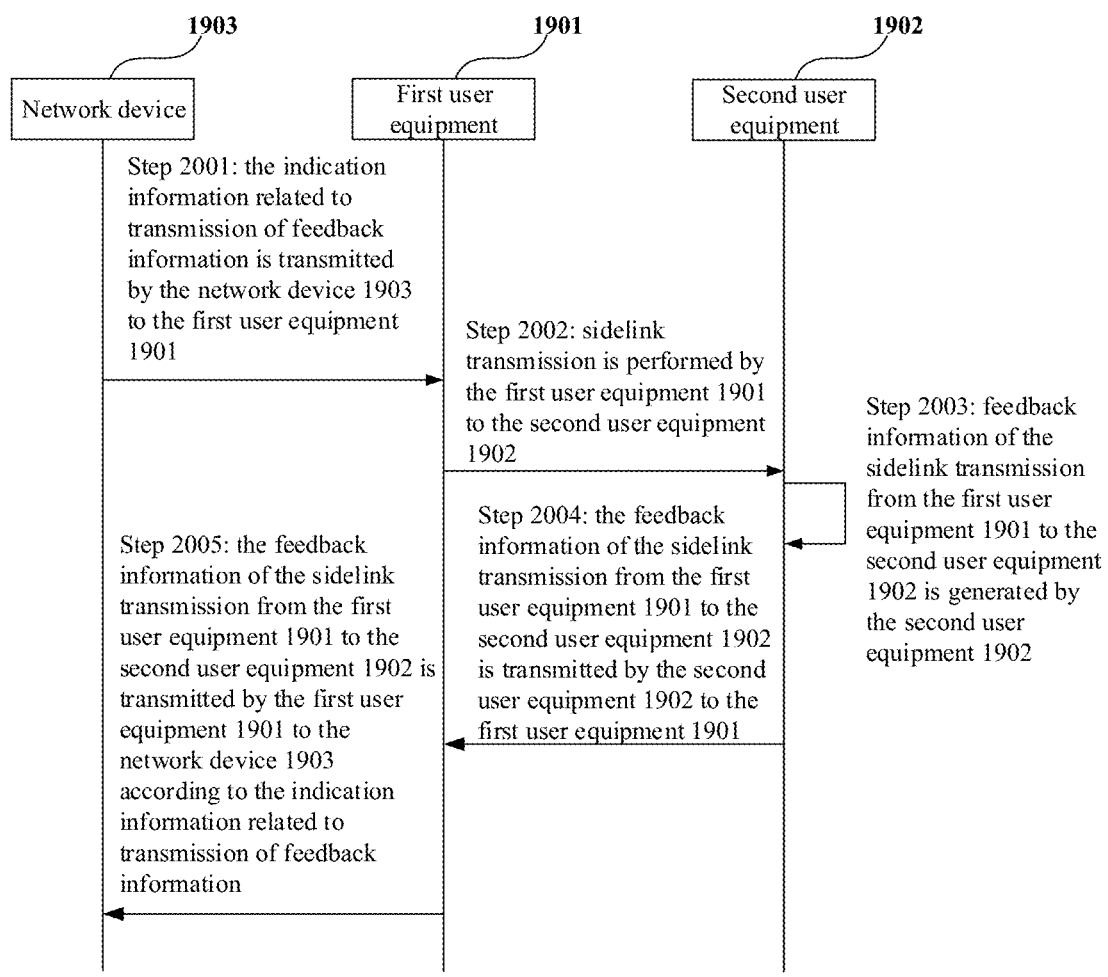
FIG. 20 is a schematic diagram of the transmission method of feedback information of Embodiment 8 of this disclosure.

FIG. 20 is a schematic diagram of the transmission method of feedback information of Embodiment 8 of this disclosure. As shown in FIG. 20, the method includes:

Step 2001: the indication information related to transmission of feedback information is transmitted by the network device 1903 to the first user equipment 1901;

Step 2002: sidelink transmission is performed by the first user equipment 1901 to the second user equipment 1902;

Step 2003: feedback information of the sidelink transmission from the first user equipment 1901 to the second user equipment 1902 is generated by the second user equipment 1902;

Step 2004: the feedback information of the sidelink transmission from the first user equipment 1901 to the second user equipment 1902 is transmitted by the second user equipment 1902 to the first user equipment 1901; and Step 2005: the feedback information of the sidelink transmission from the first user equipment 1901 to the second user equipment 1902 is transmitted by the first user equipment 1901 to the network device 1903 according to the indication information related to transmission of feedback information.

In this embodiment, reference may be made to what are described in Embodiment 1 and Embodiment 4 for particular implementations of the above steps, which shall not be described herein any further.

It can be seen from the above embodiment that the first user equipment receives the sidelink feedback information generated by the second user equipment and transmits the sidelink feedback information to the network device, thereby providing a feedback mechanism of sidelink transmission in a groupcast form, and improving reliability of data transmission of a sidelink. Furthermore, SCI indication information in the sidelink control channel PSCCH does not need to include a field related to indicating that the target UE performs feedback.

Embodiment 9

The embodiment of this disclosure provides a transmission method of feedback information, applied to a user equipment side and a network device side. This method corresponds to the transmission method of feedback information described in Embodiment 2 that is applied to a user equipment side and the transmission method of feedback information described in Embodiment 4 that is applied to a network device side.

Figure 21:
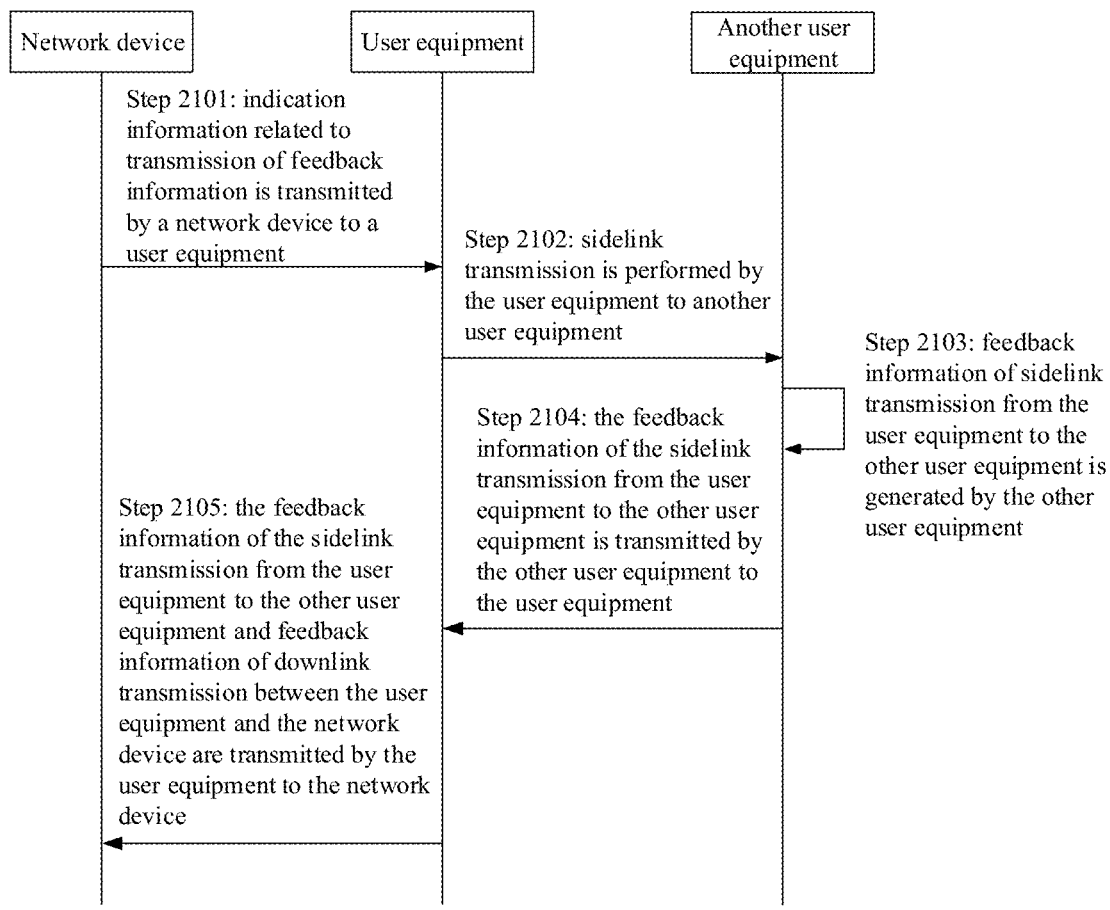
FIG. 21 is a schematic diagram of the transmission method of feedback information of Embodiment 9 of this disclosure.

FIG. 21 is a schematic diagram of the transmission method of feedback information of Embodiment 9 of this disclosure. As shown in FIG. 21, the method includes:

Step 2101: indication information related to transmission of feedback information is transmitted by a network device to a user equipment;

Step 2102: sidelink transmission is performed by the user equipment to another user equipment;

Step 2103: feedback information of sidelink transmission from the user equipment to the other user equipment is generated by the other user equipment;

Step 2104: the feedback information of the sidelink transmission from the user equipment to the other user equipment is transmitted by the other user equipment to the user equipment; and Step 2105: the feedback information of the sidelink transmission from the user equipment to the other user equipment and feedback information of downlink transmission between the user equipment and the network device are transmitted by the user equipment to the network device.

In this embodiment, reference may be made to what are described in Embodiment 2 and Embodiment 4 for particular implementations of the above steps, which shall not be described herein any further.

It can be seen from the above embodiment that the user equipment transmits the sidelink feedback information to the network device, thereby providing a feedback mechanism of sidelink transmission in a groupcast form, and improving reliability of data transmission of a sidelink. Furthermore, a feedback mechanism for the case of presence of feedback information of downlink transmission and feedback information of sidelink transmission is provided.

Embodiment 10

The embodiment of this disclosure provides a transmission method of feedback information, applied to a user equipment side and a network device side. This method corresponds to the transmission method of feedback information described in Embodiment 3 that is applied to a user equipment side and the transmission method of feedback information described in Embodiment 5 that is applied to a network device side.

Figure 22:
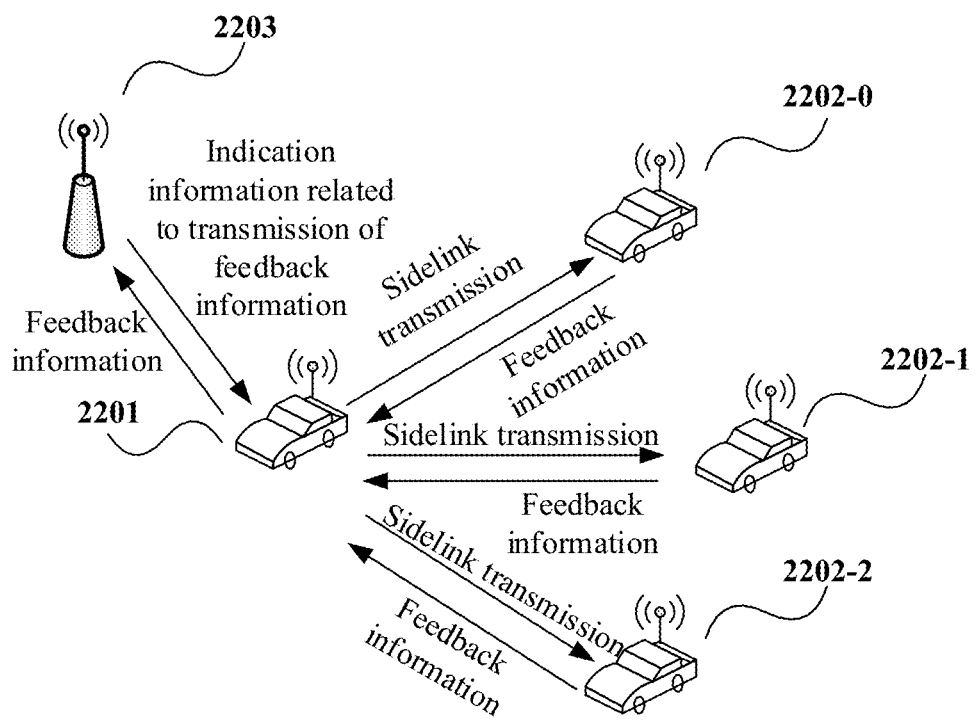
FIG. 22 is a schematic diagram of an application scenario of Embodiment 10 of this disclosure.

FIG. 22 is a schematic diagram of an application scenario of Embodiment 10 of this disclosure. As shown in FIG. 22, a first user equipment 2201 taken as a source UE transmits data to at least two second user equipments 2202 belonging to a group taken as target UEs for performing sidelink transmission. FIG. 22 shall be described by taking three second user equipments 2202-0~2202-2 as examples. The three second user equipments 2202-0~2202-2 belonging to a group may be either under coverage of a cell where the first user equipment 2201 is located, or out of the coverage, the cell being served by a network device 2203. The network device 2203 transmits indication information related to transmission of feedback information to the first user equipment 2201, and the first user equipment 2201 receives from the three second user equipments 2202-0~2202-2 belonging to a group feedback information of sidelink transmission from the first user equipment to the three second user equipments 2202-0~2202-2 belonging to a group and transmits the feedback information to the network device 2203.

Figure 23:
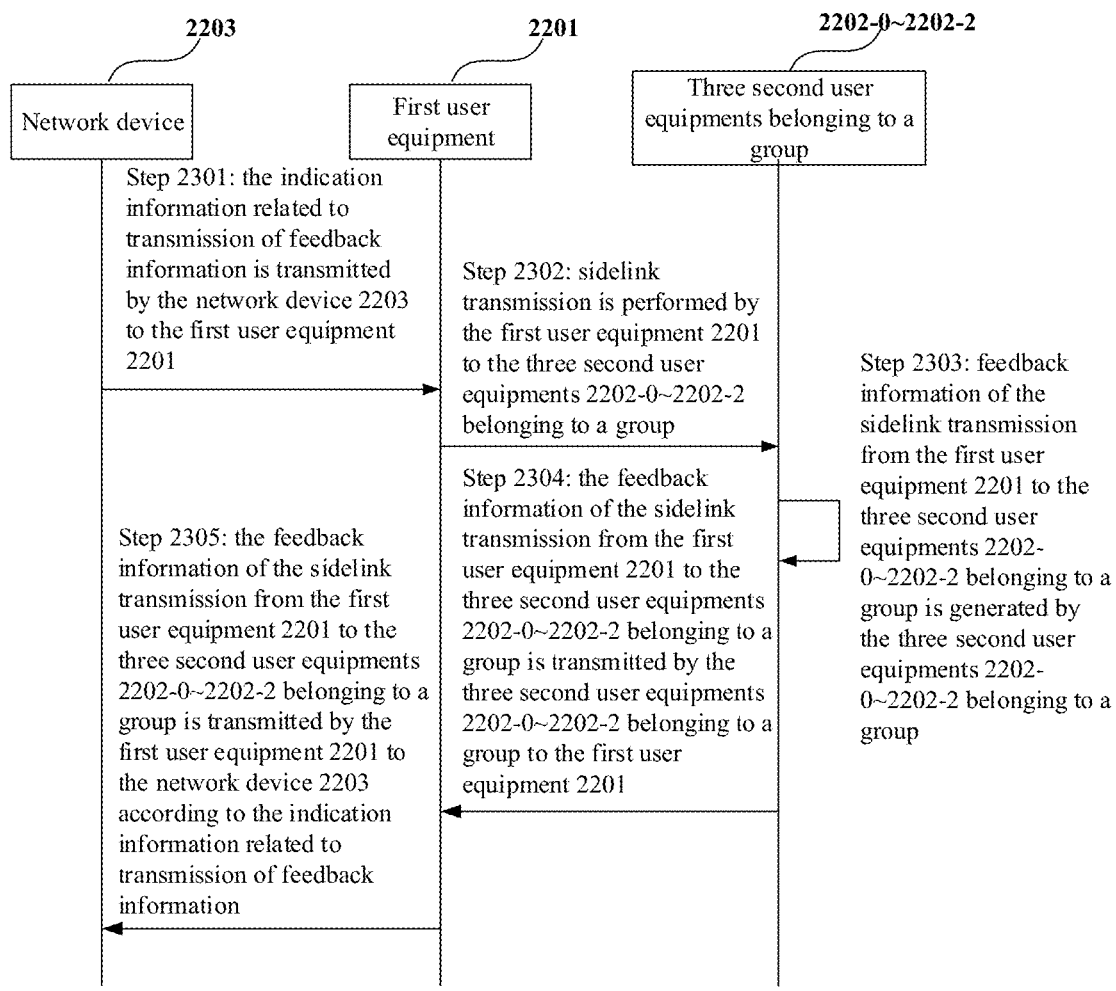
FIG. 23 is a schematic diagram of the transmission method of feedback information of Embodiment 10 of this disclosure.

FIG. 23 is a schematic diagram of the transmission method of feedback information of Embodiment 10 of this disclosure. As shown in FIG. 23, the method includes:

Step 2301: the indication information related to transmission of feedback information is transmitted by the network device 2203 to the first user equipment 2201;

Step 2302: sidelink transmission is performed by the first user equipment 2201 to the three second user equipments 2202-0~2202-2 belonging to a group;

Step 2303: feedback information of the sidelink transmission from the first user equipment 2201 to the three second user equipments 2202-0~2202-2 belonging to a group is generated by the three second user equipments 2202-0~2202-2 belonging to a group;

Step 2304: the feedback information of the sidelink transmission from the first user equipment 2201 to the three second user equipments 2202-0~2202-2 belonging to a group is transmitted by the three second user equipments 2202-0~2202-2 belonging to a group to the first user equipment 2201; and Step 2305: the feedback information of the sidelink transmission from the first user equipment 2201 to the three second user equipments 2202-0~2202-2 belonging to a group is transmitted by the first user equipment 2201 to the network device 2203 according to the indication information related to transmission of feedback information.

In this embodiment, reference may be made to what are described in Embodiment 3 and Embodiment 5 for particular implementations of the above steps, which shall not be described herein any further.

It can be seen from the above embodiment that the target UEs belonging to a group transmit sidelink feedback information to the network device via the source UE, thereby providing a feedback mechanism of sidelink transmission in a groupcast form, and improving reliability of data transmission of a sidelink.

Embodiment 11

The embodiment of this disclosure provides a transmission apparatus of feedback information, provided at a user equipment side. As a principle of the apparatus for solving problems is similar to that of the method in Embodiment 1, reference may be made to the implementation of the method in Embodiment 1 for implementation of this apparatus, with identical contents being going to be described herein any further.

Figure 24:
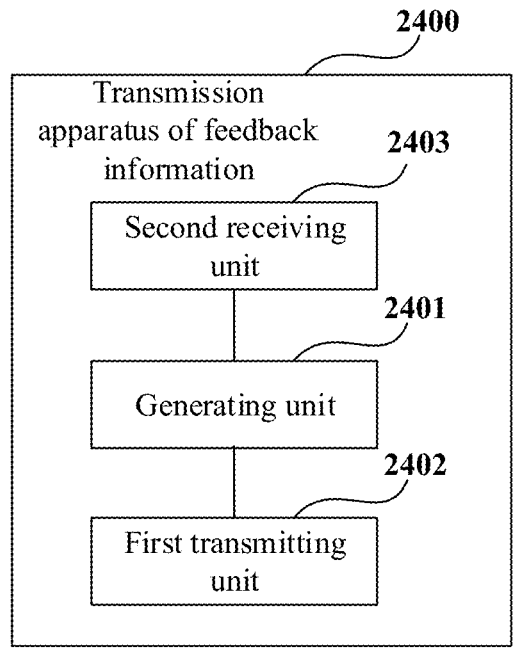
FIG. 24 is a schematic diagram of the transmission apparatus of feedback information of Embodiment 11 of this disclosure.

FIG. 24 is a schematic diagram of the transmission apparatus of feedback information of Embodiment 11 of this disclosure, which is provided at a second user equipment side. As shown in FIG. 24, an apparatus 2400 includes:
a generating unit 2401 configured to generate sidelink feedback information by the second user equipment; and
a first transmitting unit 2402 configured to transmit the sidelink feedback information to a network device,
the sidelink feedback information being feedback information of sidelink transmission from the first user equipment to the second user equipment.

In this embodiment, the apparatus 2400 may further include:
a second receiving unit 2403 configured to receive indication information related to transmission of feedback information from the first user equipment or the network device;
and the first transmitting unit 2402, according to the indication information related to transmission of feedback information, transmits the feedback information of sidelink transmission from the first user equipment to the second user equipment to the network device.

The indication information related to transmission of feedback information includes a time for transmitting the feedback information of sidelink transmission and/or a resource used for transmitting the feedback information of sidelink transmission.

In this embodiment, the time for transmitting the feedback information of sidelink transmission by the first transmitting unit 2402 is contained in the indication information related to transmission of feedback information, or is predefined, or is preconfigured;

For example, the time for transmitting the feedback information of sidelink transmission is: a first time after a last symbol of a physical downlink control channel (PDCCH) carrying the indication information related to transmission of feedback information received from the first user equipment or the network device or a last symbol of a slot where the physical downlink control channel is located, or a second time after a last symbol of a physical sidelink shared channel (PSSCH) carrying sidelink-transmitted data received from the first user equipment or a last symbol of a slot where the physical sidelink shared channel is located.

In this embodiment, the indication information related to transmission of feedback information may be transmitted via control signaling.

For example, when the second receiving unit 2403 receives the indication information related to transmission of feedback information from the first user equipment, the control signaling is borne by a physical sidelink control channel (PSCCH); and/or
when the second receiving unit 2403 receives the indication information related to transmission of feedback information from the network device, the control signaling is borne by a physical downlink control channel (PDCCH). Domains related to scheduling in the physical downlink control channel are set to be invalid, and domains related to feedback are set to be valid.

Figure 25:
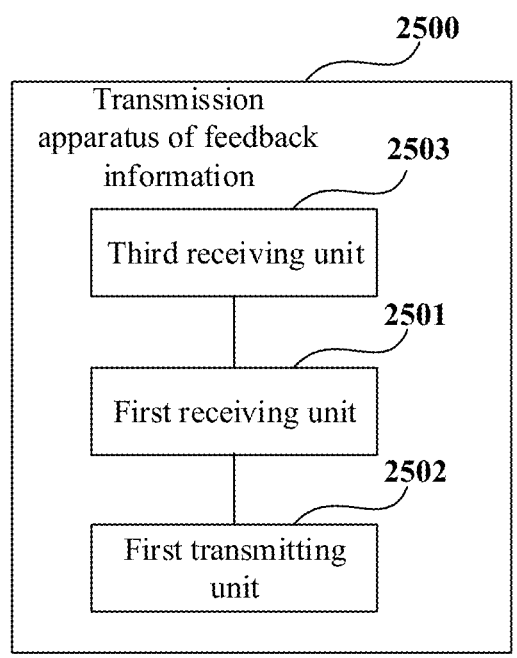
FIG. 25 is another schematic diagram of the transmission apparatus of feedback information of Embodiment 11 of this disclosure.

FIG. 25 is another schematic diagram of the transmission apparatus of feedback information of Embodiment 11 of this disclosure, which is provided at a first user equipment side. As shown in FIG. 25, an apparatus 2500 includes:
a first receiving unit 2501 configured to receive sidelink feedback information by the first user equipment; and
a first transmitting unit 2502 configured to transmit the sidelink feedback information to a network device,
the sidelink feedback information being feedback information of sidelink transmission from the first user equipment to the second user equipment.

In this embodiment, the apparatus 2500 may further include:
a third receiving unit 2503 configured to receive the indication information related to transmission of feedback information from the network device;
the first receiving unit 2501 receives the feedback information of sidelink transmission from the first user equipment to the second user equipment from the second user equipment,
and the first transmitting unit 2502, according to the indication information related to transmission of feedback information received by the third receiving unit, transmits the feedback information of sidelink transmission from the first user equipment to the second user equipment to the network device.

For example, the receiving the indication information related to transmission of feedback information from the network device may include:
receiving the indication information related to transmission of feedback information via a physical downlink control channel (PDCCH).

For example, the indication information related to transmission of feedback information includes a time for transmitting the feedback information of sidelink transmission and/or a resource used for transmitting the feedback information of sidelink transmission.

For example, the time for transmitting the feedback information of sidelink transmission is: a third time after a last symbol of a PDCCH carrying the indication information related to transmission of feedback information received from the third receiving unit 2503 or a last symbol of a slot where the PDCCH is located, or a fourth time after a last symbol of a PSSCH carrying sidelink-transmitted data transmitted to the second user equipment or a last symbol of a slot where the PSSCH is located.

Figure 26:
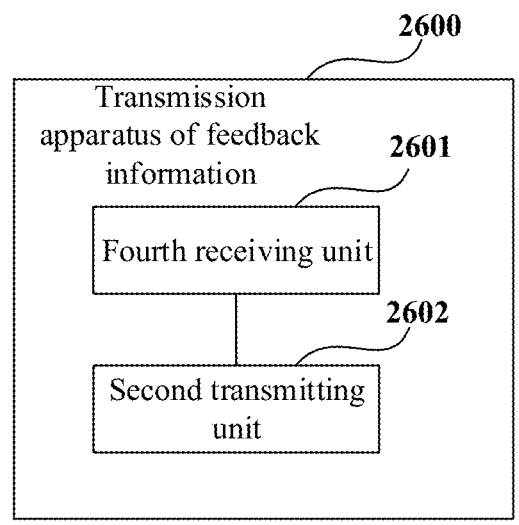
FIG. 26 is a further schematic diagram of the transmission apparatus of feedback information of Embodiment 11 of this disclosure.

FIG. 26 is a further schematic diagram of the transmission apparatus of feedback information of Embodiment 11 of this disclosure, which is provided at a first user equipment side, and corresponds to the transmission apparatus of feedback information provided at the second user equipment side shown in FIG. 24. As shown in FIG. 26, an apparatus 2600 includes:

a fourth receiving unit 2601 configured to receive indication information related to transmission of feedback information from a network device; and a second transmitting 2602 unit configured to forward the indication information related to transmission of feedback information to a second user equipment;

the first user equipment performs sidelink transmission to the second user equipment.

The second transmitting unit 2602 may transmit the indication information related to transmission of feedback information to the second user equipment via a physical sidelink control channel (PSCCH).

The fourth receiving unit 2601 receives the indication information related to transmission of feedback information via a physical downlink control channel (PDCCH).

Figure 27:
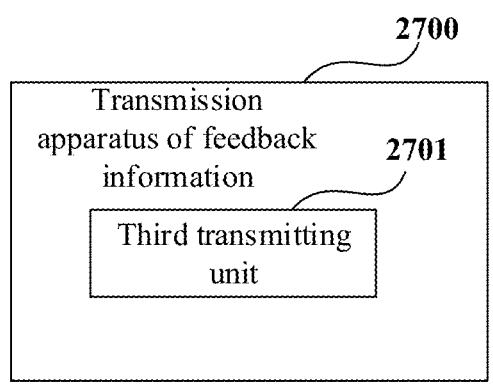
FIG. 27 is still another schematic diagram of the transmission apparatus of feedback information of Embodiment 11 of this disclosure.

FIG. 27 is still another schematic diagram of the transmission apparatus of feedback information of Embodiment 11 of this disclosure, which is provided at a second user equipment side, and corresponds to the transmission apparatus of feedback information provided at the first user equipment side shown in FIG. 25. As shown in FIG. 27, an apparatus 2700 includes:

a third transmitting unit 2701 configured to transmit to a first user equipment feedback information of sidelink transmission performed by the first user equipment to the second user equipment.

It can be seen from the above embodiment that the user equipment receives or generates the sidelink feedback information and transmit the sidelink feedback information to the network device, thereby providing a feedback mechanism of sidelink transmission, and improving reliability of data transmission of a sidelink.

Embodiment 12

The embodiment of this disclosure provides a transmission apparatus of feedback information, provided at a user equipment side. As a principle of the apparatus for solving problems is similar to that of the method in Embodiment 2, reference may be made to the implementation of the method in Embodiment 2 for implementation of this apparatus, with identical contents being going to be described herein any further.

Figure 28:
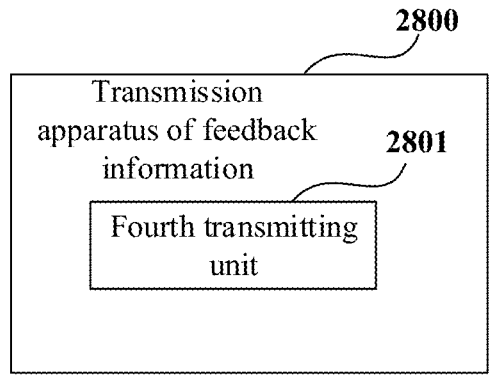
FIG. 28 is a schematic diagram of the transmission apparatus of feedback information of Embodiment 12 of this disclosure.

FIG. 28 is a schematic diagram of the transmission apparatus of feedback information of Embodiment 12 of this disclosure, which is provided at a user equipment side. As shown in FIG. 28, an apparatus 2800 includes:

a fourth transmitting unit 2801 configured to transmit feedback information of sidelink transmission from the user equipment to another user equipment and feedback information of downlink transmission between the user equipment and a network device to the network device.

In this embodiment, the feedback information of sidelink transmission and the feedback information of downlink transmission may be transmitted on identical or different resources.

For example, the feedback information of sidelink transmission may be transmitted via a first resource indicated by a first physical downlink control channel scheduling sidelink transmission, the feedback information of downlink transmission is transmitted via a second resource indicated by a second physical downlink control channel scheduling downlink transmission, and the first resource and the second resource are identical or different.

In this embodiment, the fourth transmitting unit 2801 may transmit feedback information combined by the feedback information of sidelink transmission and the feedback information of downlink transmission to the network device.

For example, the combined feedback information includes: feedback codewords formed by ranking and cascading feedback results in a predetermined order of carriers of the downlink transmission and carriers of the sidelink transmission first and then in an order of transmission occasions, the predetermined order being that the carriers of the downlink transmission are in the front and the carriers of the sidelink transmission are at the back, or the carriers of the sidelink transmission are in the front and the carriers of the downlink transmission are at the back, or feedback codewords formed by cascading first feedback codewords formed by ranking and cascading feedback results in an order of carriers of the downlink transmission and then in an order of transmission occasions and second feedback codewords formed by ranking and cascading the feedback results in an order of carriers of the sidelink transmission and then in an order of the transmission occasions; the first feedback codewords are in front of the second feedback codewords, or the first feedback codewords are behind the second feedback codewords.

It can be seen from the above embodiment that the user equipment transmits the sidelink feedback information to the network device, thereby providing a feedback mechanism for sidelink transmission, which may improve reliability of data transmission of the sidelink. Furthermore, a feedback mechanism for the case of presence of feedback information of downlink transmission and feedback information of sidelink transmission is provided.

Embodiment 13

The embodiment of this disclosure provides a transmission apparatus of feedback information, provided at a user equipment side. As a principle of the apparatus for solving problems is similar to that of the method in Embodiment 3, reference may be made to the implementation of the method in Embodiment 3 for implementation of this apparatus, with identical contents being going to be described herein any further.

Figure 29:
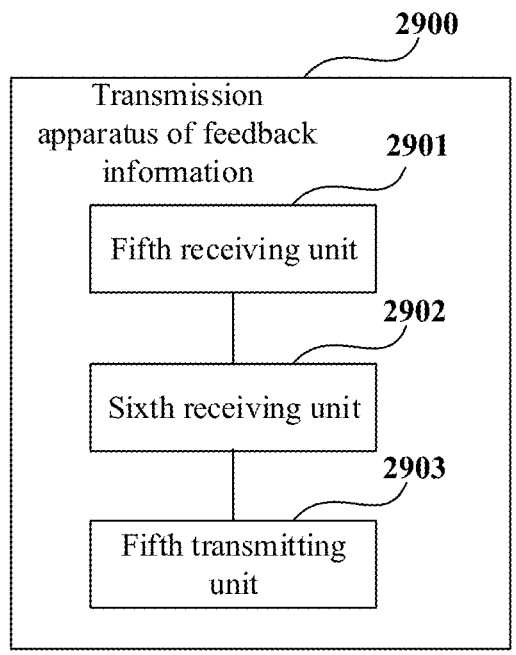
FIG. 29 is a schematic diagram of the transmission apparatus of feedback information of Embodiment 13 of this disclosure.

FIG. 29 is a schematic diagram of the transmission apparatus of feedback information of Embodiment 13 of this disclosure, which is provided at a first user equipment side. As shown in FIG. 29, an apparatus 2900 includes:

a fifth receiving unit 2901 configured to receive indication information related to transmission of feedback information from a network device;

a sixth receiving unit 2902 configured to respectively receive, from at least two second user equipments belonging to a group, feedback information of sidelink transmission from the first user equipment to the at least two second user equipments; and a fifth transmitting unit 2903 configured to transmit feedback information of sidelink transmission to the network device according to the indication information related to transmission of feedback information and the feedback information of sidelink transmission from the first user equipment to the at least two second user equipments.

In this embodiment, the fifth receiving unit 2901 may receive the indication information related to transmission of feedback information via a physical downlink control channel (PDCCH).

For example, the indication information related to transmission of feedback information includes a time for transmitting the feedback information of sidelink transmission and/or a resource used for transmitting the feedback information of sidelink transmission.

In this embodiment, the time for transmitting the feedback information of sidelink transmission by the fifth transmitting unit 2901 may be: a third time after a last symbol of a PDCCH carrying the indication information related to transmission of feedback information received from the fifth receiving unit 2901 or a last symbol of a slot where the PDCCH is located from the network device, or a fourth time after a last symbol of a PSSCH carrying sidelink-transmitted data transmitted to the at least two second user equipments or a last symbol of a slot where the PSSCH is located.

In this embodiment, feedback information of sidelink transmission transmitted by the fifth transmitting unit 2901 to the network device may include: feedback codewords formed by cascading at least two feedback codewords of sidelink transmissions from the first user equipment to the at least two second user equipments respectively received from the at least two second user equipments, or feedback codewords formed by cascading feedback results in a predetermined order of carriers of sidelink transmissions from the first user equipment to the at least two second user equipments and then in an order of transmission occasions, the predetermined order being an order of sequence numbers of the at least two second user equipments.

In this embodiment, the fifth transmitting unit 2901 may perform comprehensive processing on the feedback information of sidelink transmissions from the first user equipment to the at least two second user equipments to obtain overall feedback information of sidelink transmissions from the first user equipment to the at least two second user equipments, and transmits the overall feedback information to the network device.

For example, the comprehensive processing is a logic "and" computing process.

In this embodiment, the fifth transmitting unit may further be configured to transmit feedback information of downlink transmission between the first user equipment and the network device to the first user equipment.

In this embodiment, the feedback information of sidelink transmission and the feedback information of downlink transmission may be transmitted on identical or different resources.

In this embodiment, the fifth transmitting unit 2901 may transmit feedback information combined by the feedback information of sidelink transmission and the feedback information of downlink transmission to the network device.

It can be seen from the above embodiment that target UEs belonging to a group transmit sidelink feedback information to the network device via the source UE, thereby providing a feedback mechanism of sidelink transmission in a groupcast form, and improving reliability of data transmission of a sidelink.

Embodiment 14

The embodiment of this disclosure provides a transmission apparatus of feedback information, provided at a network device side. As a principle of the apparatus for solving problems is similar to that of the method in Embodiment 4, reference may be made to the implementation of the method in Embodiment 4 for implementation of this apparatus, with identical contents being going to be described herein any further.

Figure 30:
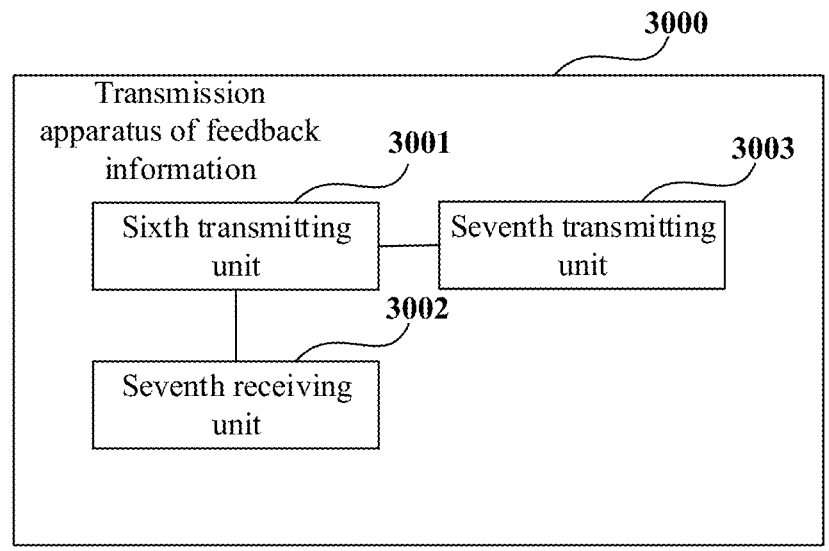
FIG. 30 is a schematic diagram of the transmission apparatus of feedback information of Embodiment 14 of this disclosure.

FIG. 30 is a schematic diagram of the transmission apparatus of feedback information of Embodiment 14 of this disclosure, which is provided at a network device side. As shown in FIG. 30, an apparatus 3000 includes:

a sixth transmitting unit 3001 configured to transmit indication information related to transmission of feedback information to a first user equipment or a second user equipment; and a seventh receiving unit 3002 configured to receive from the first user equipment or the second user equipment feedback information of sidelink transmission from the first user equipment to the second user equipment.

In this embodiment, the sixth transmitting unit 3001 may transmit the indication information related to transmission of feedback information via a physical downlink control channel (PDCCH).

In this embodiment, the sixth transmitting unit 3001 may transmit a second physical downlink control channel to the second user equipment, domains related to scheduling in the second physical downlink control channel being set to be invalid, and domain related to feedback being set to be valid;

In this embodiment, the apparatus 3000 may further include:

a seventh transmitting unit 3003 configured to transmit a first physical downlink control channel to the first user equipment, domain related to scheduling in the first physical downlink control channel being set to be valid, and domain related to feedback being set to be invalid.

It can be seen from the above that the user equipment transmits the sidelink feedback information to the network device, thereby providing a feedback mechanism of sidelink transmission, and improving reliability of data transmission of a sidelink.

Embodiment 15

The embodiment of this disclosure provides a transmission apparatus of feedback information, provided at a network device side. As a principle of the apparatus for solving problems is similar to that of the method in Embodiment 5, reference may be made to the implementation of the method in Embodiment 5 for implementation of this apparatus, with identical contents being going to be described herein any further.

Figure 31:
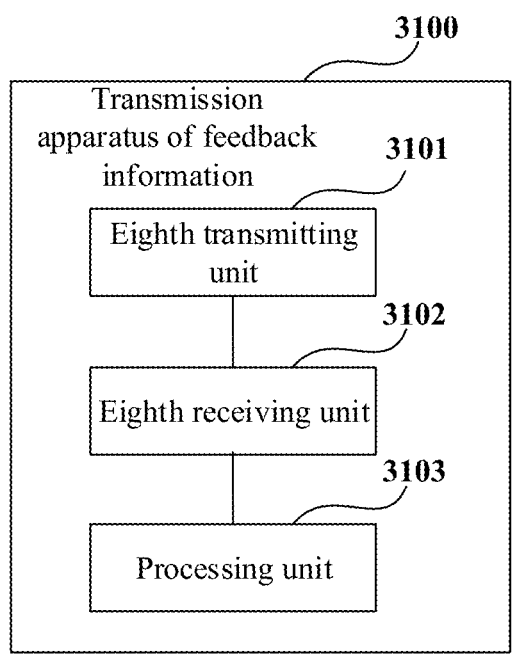
FIG. 31 is a schematic diagram of the transmission apparatus of feedback information of Embodiment 15 of this disclosure.

FIG. 31 is a schematic diagram of the transmission apparatus of feedback information of Embodiment 15 of this disclosure, which is provided at a network device side. As shown in FIG. 31, an apparatus 3100 includes:

an eighth transmitting unit 3101 configured to transmit indication information related to transmission of feedback information to a first user equipment; and an eighth receiving unit 3102 configured to receive from the first user equipment feedback information of sidelink transmission from the first user equipment to at least two second user equipments belonging to a group.

In this embodiment, the apparatus may further include:

a processing unit 3103 configured to perform comprehensive processing on the feedback information of sidelink transmissions from the first user equipment to the at least two second user equipments to obtain overall feedback information of sidelink transmissions from the first user equipment to the at least two second user equipments.

In this embodiment, the feedback information of sidelink transmission received from the first user equipment is overall feedback information obtained by performing comprehensive processing on the feedback information of sidelink transmissions from the first user equipment to the at least two second user equipments.

It can be seen from the above embodiment that target UEs belonging to a group transmit sidelink feedback information to the network device via the source UE, thereby providing a feedback mechanism of sidelink transmission in a groupcast form, and improving reliability of data transmission of a sidelink.

Embodiment 16

The embodiment of this disclosure provides a user equipment, including the transmission apparatus of feedback information described in Embodiment 11 or 12 or 13.

Figure 32:
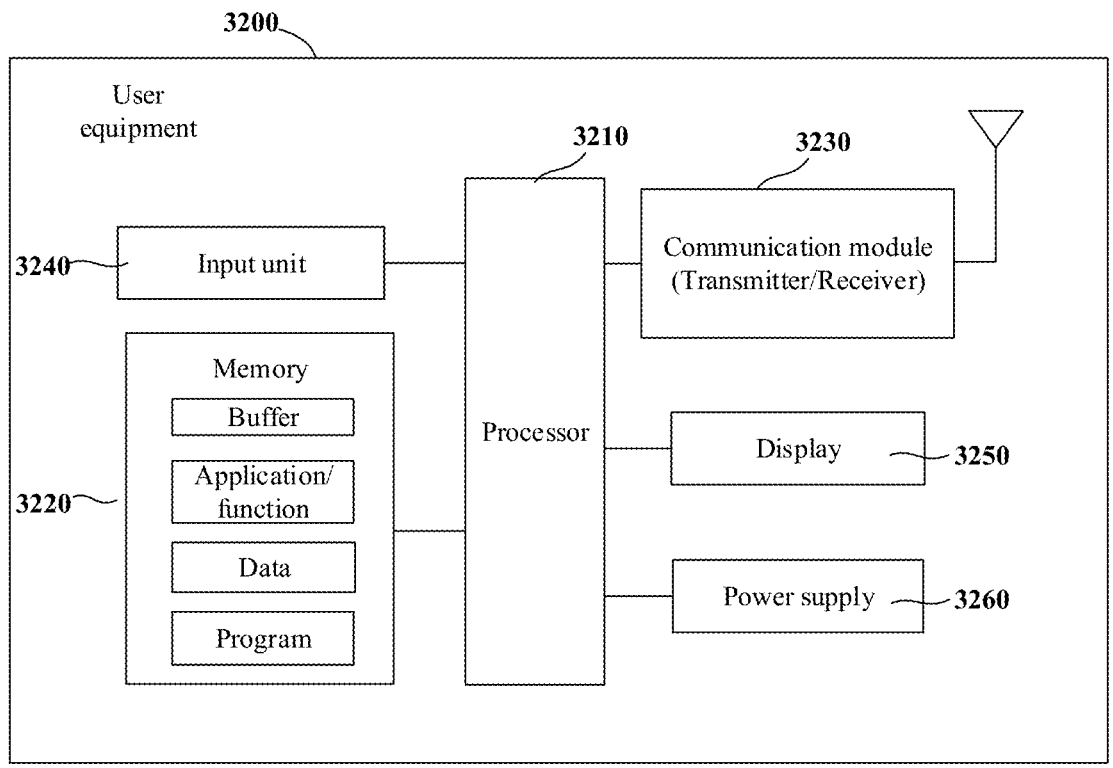
FIG. 32 is a block diagram of a systematic structure of the user equipment of Embodiment 16 of this disclosure.

FIG. 32 is a block diagram of a systematic structure of the user equipment of Embodiment 16 of this disclosure. As shown in FIG. 32, the user equipment 3200 may include a processor 3210 and a memory 3220, the memory 3220 being coupled to the processor 3210. It should be noted that this figure is illustrative only, and other types of structures may also be used, so as to supplement or replace this structure and achieve a telecommunications function or other functions.

In one implementation, the functions of the transmission apparatus of feedback information may be integrated into the processor 3210. For example, the processor 3210 may be configured to: receive sidelink feedback information by a first user equipment, or generate sidelink feedback information by a second user equipment; and transmit the sidelink feedback information to a network device, the sidelink feedback information being feedback information of sidelink transmission from the first user equipment to the second user equipment.

Or, the processor 3210 may be configured to: receive indication information related to transmission of feedback information from a network device; and forward the indication information related to transmission of feedback information to a second user equipment; for example, the first user equipment performs sidelink transmission to the second user equipment.

Or, the processor 3210 may be configured to: transmit to a first user equipment feedback information of sidelink transmission performed by the first user equipment to a second user equipment.

Or, the processor 3210 may be configured to: transmit feedback information of sidelink transmission from the user equipment to another user equipment and feedback information of downlink transmission between the user equipment and a network device to the network device.

Or, the processor 3210 may be configured to: receive indication information related to transmission of feedback information from a network device; respectively receive, from at least two second user equipments belonging to a group, feedback information of sidelink transmission from the first user equipment to the at least two second user equipments; and transmit feedback information of sidelink transmission to the network device according to the indication information related to transmission of feedback information and the feedback information of sidelink transmission from the first user equipment to the at least two second user equipments.

In another implementation, the transmission apparatus of feedback information and the processor 3210 may be configured separately; for example, the transmission apparatus of feedback information may be configured as a chip connected to the processor 3210, and the functions of the transmission apparatus of feedback information are executed under control of the processor 3210.

As shown in FIG. 32, the user equipment 3200 may further include a communication module 3230, an input unit 3240, a display 3250, and a power supply 3260, etc. It should be noted that the user equipment 3200 does not necessarily include all the parts shown in FIG. 32. Furthermore, the user equipment 3200 may include parts not shown in FIG. 32, and the prior art may be referred to.

As shown in FIG. 32, the processor 3210 is sometimes referred to as a controller or an operational control, which may include a microprocessor or other processor devices and/or logic devices. The processor 3210 receives input and controls operations of components of the user equipment 3200.

The memory 3220 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 3210 may execute programs stored in the memory 3220, so as to realize information storage or processing, etc. Functions of other parts are similar to those of the prior art, which shall not be described herein any further. The parts of the user equipment 3200 may be realized by specific hardware, firmware, software, or any combination thereof, without departing from the scope of this disclosure.

It can be seen from the above embodiment that the user equipment receives or generates sidelink feedback information and transmits the sidelink feedback information to the network device, thereby providing a feedback mechanism for sidelink transmission, which may improve reliability of data transmission of the sidelink.

Or, the user equipment transmits the sidelink feedback information to the network device, thereby providing a feedback mechanism for sidelink transmission, which may improve reliability of data transmission of the sidelink. Furthermore, a feedback mechanism for the case of presence of feedback information of downlink transmission and feedback information of sidelink transmission is provided.

Or, the target UEs belonging to a group transmit sidelink feedback information to the network device via the source UE, thereby providing a feedback mechanism of sidelink transmission in a groupcast form, and improving reliability of data transmission of a sidelink.

Embodiment 17

The embodiment of this disclosure provides a network device, including the transmission apparatus of feedback information described in Embodiment 14 or 15.

Figure 33:
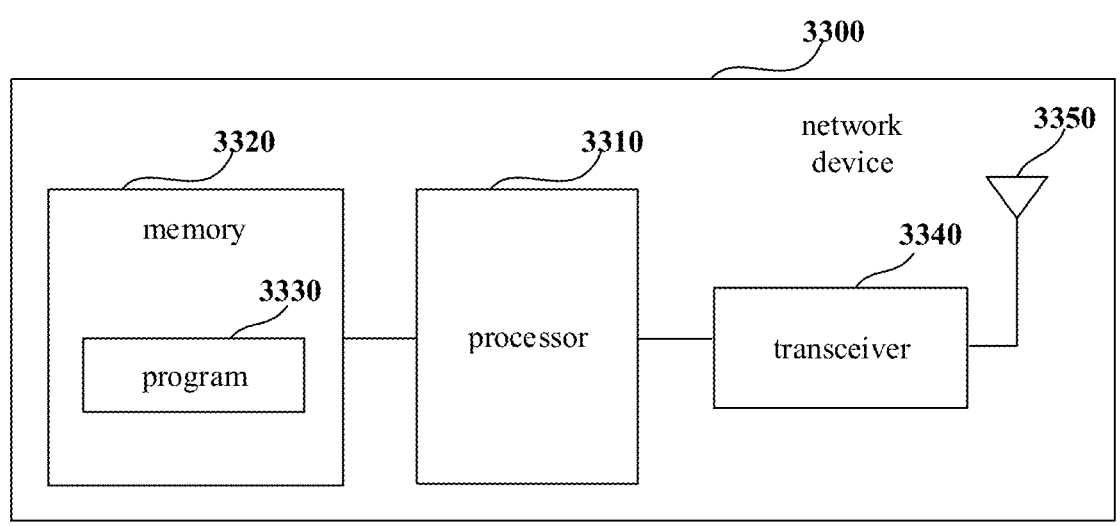
FIG. 33 is a schematic diagram of a structure of the network device of Embodiment 17 of this disclosure.

FIG. 33 is a schematic diagram of a structure of the network device of Embodiment 17 of this disclosure. As shown in FIG. 33, the network device 3300 may include a processor 3310 and a memory 3320, the memory 3320 being coupled to the processor 3310. The memory 3320 may store various data, and furthermore, it may store a program 3330 for data processing, and execute the program 3330 under control of the processor 3310, so as to receive various information transmitted by a user equipment, and transmit various information to the user equipment.

In one implementation, the functions of the transmission apparatus of feedback information may be integrated into the processor 3310. For example, the processor 3310 may be configured to: transmit indication information related to transmission of feedback information to a first user equipment or a second user equipment; and receive from the first user equipment or the second user equipment feedback information of sidelink transmission from the first user equipment to the second user equipment.

Or, the processor 3310 may be configured to: transmit indication information related to transmission of feedback information to a first user equipment; and receive from the first user equipment feedback information of sidelink transmission from the first user equipment to at least two second user equipments belonging to a group.

In another implementation, the transmission apparatus of feedback information and the processor 3310 may be configured separately; for example, the transmission apparatus of feedback information may be configured as a chip connected to the processor 3310, and the functions of the transmission apparatus of feedback information are executed under control of the processor 3310.

Furthermore, as shown in FIG. 33, the network device 3300 may include a transceiver 3340, and an antenna 3350, etc. For example, functions of the above components are similar to those in the prior art, and shall not be described herein any further. It should be noted that the network device 3300 does not necessarily include all the parts shown in FIG. 33. Furthermore, the network device 3300 may include parts not shown in FIG. 33, and the prior art may be referred to.

It can be seen from the above embodiment that the user equipment transmits the sidelink feedback information to the network device, thereby providing a feedback mechanism for sidelink transmission, which may improve reliability of data transmission of the sidelink.

Or, the target UEs belonging to a group transmit sidelink feedback information to the network device via the source UE, thereby providing a feedback mechanism of sidelink transmission in a groupcast form, and improving reliability of data transmission of a sidelink.

Embodiment 18

The embodiment of this disclosure provides a communication system, including the user equipment described in Embodiment 17 and/or the network device described in Embodiment 18.

For example, reference may be made to FIG. 1 for a structure of the communication system. As shown in FIG. 1, the communication system 100 includes a network device 101 and user equipments 102, 103. The user equipments 102, 103 may be identical to the user equipment described in Embodiment 16, and the network device 101 may be identical to the network device described in Embodiment 17, with repeated parts being not going to be described herein any further.

It can be seen from the above embodiment that the user equipment transmits the sidelink feedback information to the network device, thereby providing a feedback mechanism for sidelink transmission, which may improve reliability of data transmission of the sidelink.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 24 and 25 may either correspond to software modules of procedures of a computer program, or correspond to hardware modules. Such software modules may respectively correspond to the steps shown in FIG. 2. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 24 and 25 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 24 and 25 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

Regarding implementations containing the above embodiments, following supplements are further discloses:

Supplement 1. A transmission apparatus of feedback information, provided at a first user equipment side or a second user equipment side, the apparatus including:
a first receiving unit configured to receive sidelink feedback information by the first user equipment, or a generating unit configured to generate sidelink feedback information by the second user equipment; and
a first transmitting unit configured to transmit the sidelink feedback information to a network device,
the sidelink feedback information being feedback information of sidelink transmission from the first user equipment to the second user equipment.

Supplement 2. The apparatus according to supplement 1, wherein the apparatus is provided at the second user equipment side, and the apparatus further includes:
a second receiving unit configured to receive indication information related to transmission of feedback information from the first user equipment or the network device;
and the first transmitting unit, according to the indication information related to transmission of feedback information, transmits the feedback information of sidelink transmission from the first user equipment to the second user equipment to the network device.

Supplement 3. The apparatus according to supplement 2, wherein,
the indication information related to transmission of feedback information includes a time for transmitting the feedback information of sidelink transmission and/or a resource used for transmitting the feedback information of sidelink transmission.

Supplement 4. The apparatus according to supplement 2, wherein,
the time for transmitting the feedback information of sidelink transmission by the first transmitting unit is contained in the indication information related to transmission of feedback information, or is predefined, or is preconfigured;
and the time for transmitting the feedback information of sidelink transmission is:
a first time after a last symbol of a physical downlink control channel (PDCCH) carrying the indication information related to transmission of feedback information received from the first user equipment or the network device or a last symbol of a slot where the physical downlink control channel is located, or
a second time after a last symbol of a physical sidelink shared channel (PSSCH) carrying sidelink-transmitted data received from the first user equipment or a last symbol of a slot where the physical sidelink shared channel is located.

Supplement 5. The apparatus according to supplement 2, wherein,
the indication information related to transmission of feedback information is transmitted via control signaling.

Supplement 6. The apparatus according to supplement 5, wherein,
when the second receiving unit receives the indication information related to transmission of feedback information from the first user equipment, the control signaling is borne by a physical sidelink control channel (PSCCH); and/or
when the second receiving unit receives the indication information related to transmission of feedback information from the network device, the control signaling is borne by a physical downlink control channel (PDCCH).

Supplement 7. The apparatus according to supplement 6, wherein,
domains related to scheduling in the physical downlink control channel are set to be invalid, and domains related to feedback are set to be valid.

Supplement 8. The apparatus according to supplement 1, wherein the apparatus is provided at the first user equipment side, and the apparatus further includes:
a third receiving unit configured to receive the indication information related to transmission of feedback information from the network device;
the first receiving unit receives the feedback information of sidelink transmission from the first user equipment to the second user equipment from the second user equipment,
and the first transmitting unit, according to the indication information related to transmission of feedback information received by the third receiving unit, transmits the feedback information of sidelink transmission from the first user equipment to the second user equipment to the network device.

Supplement 9. The apparatus according to supplement 8, wherein,
the receiving the indication information related to transmission of feedback information from the network device includes:
receiving the indication information related to transmission of feedback information via a physical downlink control channel (PDCCH).

Supplement 10. The apparatus according to supplement 8, wherein,
the indication information related to transmission of feedback information includes a time for transmitting the feedback information of sidelink transmission and/or a resource used for transmitting the feedback information of sidelink transmission.

Supplement 11. The apparatus according to supplement 10, wherein,
the time for transmitting the feedback information of sidelink transmission is:
a third time after a last symbol of a PDCCH carrying the indication information related to transmission of feedback information received from the third receiving unit or a last symbol of a slot where the PDCCH is located, or a fourth time after a last symbol of a PSSCH carrying sidelink-transmitted data transmitted to the second user equipment or a last symbol of a slot where the PSSCH is located.

Supplement 12. A transmission apparatus of feedback information, provided at a first user equipment side, the apparatus including:
a fourth receiving unit configured to receive indication information related to transmission of feedback information from a network device; and
a second transmitting unit configured to forward the indication information related to transmission of feedback information to a second user equipment;
wherein the first user equipment performs sidelink transmission to the second user equipment.

Supplement 13. The apparatus according to supplement 12, wherein,
the second transmitting unit transmits the indication information related to transmission of feedback information to the second user equipment via a physical sidelink control channel (PSCCH).

Supplement 14. The apparatus according to supplement 12, wherein,
the fourth receiving unit receives the indication information related to transmission of feedback information via a physical downlink control channel (PDCCH).

Supplement 15. A transmission apparatus of feedback information, provided at a second user equipment side, the apparatus including:
a third transmitting unit configured to transmit to a first user equipment feedback information of sidelink transmission performed by the first user equipment to the second user equipment.

Supplement 16. A transmission apparatus of feedback information, provided at a user equipment side, the apparatus including:
a fourth transmitting unit configured to transmit feedback information of sidelink transmission from the user equipment to another user equipment and feedback information of downlink transmission between the user equipment and a network device to the network device.

Supplement 17. The apparatus according to supplement 12, wherein,
the feedback information of sidelink transmission and the feedback information of downlink transmission are transmitted on identical or different resources.

Supplement 18. The apparatus according to supplement 17, wherein,
the feedback information of sidelink transmission is transmitted via a first resource indicated by a first physical downlink control channel scheduling sidelink transmission,
the feedback information of downlink transmission is transmitted via a second resource indicated by a second physical downlink control channel scheduling downlink transmission,
and the first resource and the second resource are identical or different.

Supplement 19. The apparatus according to supplement 16, wherein,
the fourth transmitting unit transmits feedback information combined by the feedback information of sidelink transmission and the feedback information of downlink transmission to the network device.

Supplement 20. The apparatus according to supplement 19, wherein,
the combined feedback information includes:
feedback codewords formed by ranking and cascading feedback results in a predetermined order of carriers of the downlink transmission and carriers of the sidelink transmission first and then in an order of transmission occasions, the predetermined order being that the carriers of the downlink transmission are in the front and the carriers of the sidelink transmission are at the back, or the carriers of the sidelink transmission are in the front and the carriers of the downlink transmission are at the back, or
feedback codewords formed by cascading first feedback codewords formed by ranking and cascading feedback results in an order of carriers of the downlink transmission and then in an order of transmission occasions and second feedback codewords formed by ranking and cascading the feedback results in an order of carriers of the sidelink transmission and then in an order of the transmission occasions; wherein, the first feedback codewords are in front of the second feedback codewords, or the first feedback codewords are behind the second feedback codewords.

Supplement 21. A transmission apparatus of feedback information, provided at a first user equipment side, the apparatus including:
a fifth receiving unit configured to receive indication information related to transmission of feedback information from a network device;
a sixth receiving unit configured to respectively receive, from at least two second user equipments belonging to a group, feedback information of sidelink transmission from the first user equipment to the at least two second user equipments; and
a fifth transmitting unit configured to transmit feedback information of sidelink transmission to the network device according to the indication information related to transmission of feedback information and the feedback information of sidelink transmission from the first user equipment to the at least two second user equipments.

Supplement 22. The apparatus according to supplement 21, wherein,
the fifth receiving unit receives the indication information related to transmission of feedback information via a physical downlink control channel (PDCCH).

Supplement 23. The apparatus according to supplement 21, wherein,
the indication information related to transmission of feedback information includes a time for transmitting the feedback information of sidelink transmission and/or a resource used for transmitting the feedback information of sidelink transmission.

Supplement 24. The apparatus according to supplement 23, wherein,
the time for transmitting the feedback information of sidelink transmission by the fifth transmitting unit is:
a third time after a last symbol of a PDCCH carrying the indication information related to transmission of feedback information received from the fifth receiving unit or a last symbol of a slot where the PDCCH is located from the network device, or a fourth time after a last symbol of a PSSCH carrying sidelink-transmitted data transmitted to the at least two second user equipments or a last symbol of a slot where the PSSCH is located.

Supplement 25. The apparatus according to supplement 21, wherein,
feedback information of sidelink transmission transmitted by the fifth transmitting unit to the network device includes:
feedback codewords formed by cascading at least two feedback codewords of sidelink transmissions from the first user equipment to the at least two second user equipments respectively received from the at least two second user equipments, or
feedback codewords formed by cascading feedback results in a predetermined order of carriers of sidelink transmissions from the first user equipment to the at least two second user equipments and then in an order of transmission occasions, the predetermined order being an order of sequence numbers of the at least two second user equipments.

Supplement 26. The apparatus according to supplement 21, wherein,
the fifth transmitting unit performs comprehensive processing on the feedback information of sidelink transmissions from the first user equipment to the at least two second user equipments to obtain overall feedback information of sidelink transmissions from the first user equipment to the at least two second user equipments, and transmits the overall feedback information to the network device.

Supplement 27. The apparatus according to supplement 26, wherein, the comprehensive processing is a logic "and" computing process.

Supplement 28. The apparatus according to supplement 21, wherein, the fifth transmitting unit is further configured to transmit feedback information of downlink transmission between the first user equipment and the network device to the first user equipment.

Supplement 29. The apparatus according to supplement 28, wherein, the feedback information of sidelink transmission and the feedback information of downlink transmission are transmitted on identical or different resources.

Supplement 30. The apparatus according to supplement 28, wherein, the fifth transmitting unit transmits feedback information combined by the feedback information of sidelink transmission and the feedback information of downlink transmission to the network device.

Supplement 31. A transmission apparatus of feedback information, provided at a network device side, the apparatus including:

a sixth transmitting unit configured to transmit indication information related to transmission of feedback information to a first user equipment or a second user equipment; and a seventh receiving unit configured to receive from the first user equipment or the second user equipment feedback information of sidelink transmission from the first user equipment to the second user equipment.

Supplement 32. The apparatus according to supplement 31, wherein, the sixth transmitting unit transmits the indication information related to transmission of feedback information via a physical downlink control channel (PDCCH).

Supplement 33. The apparatus according to supplement 31, wherein, the sixth transmitting unit transmits a second physical downlink control channel to the second user equipment, domains related to scheduling in the second physical downlink control channel being set to be invalid, and domain related to feedback being set to be valid;

and the apparatus further includes:

a seventh transmitting unit configured to transmit a first physical downlink control channel to the first user equipment, domain related to scheduling in the first physical downlink control channel being set to be valid, and domain related to feedback being set to be invalid.

Supplement 34. A transmission apparatus of feedback information, provided at a network device side, the apparatus including:

an eighth transmitting unit configured to transmit indication information related to transmission of feedback information to a first user equipment; and an eighth receiving unit configured to receive from the first user equipment feedback information of sidelink transmission from the first user equipment to at least two second user equipments belonging to a group.

Supplement 35. The apparatus according to supplement 34, wherein the apparatus further includes:

a processing unit configured to perform comprehensive processing on the feedback information of sidelink transmissions from the first user equipment to the at least two second user equipments to obtain overall feedback information of sidelink transmissions from the first user equipment to the at least two second user equipments.

Supplement 36. The apparatus according to supplement 34, wherein, the feedback information of sidelink transmission received from the first user equipment is overall feedback information obtained by performing comprehensive processing on the feedback information of sidelink transmissions from the first user equipment to the at least two second user equipments.

Supplement 37. A user equipment, including the apparatus as described in any one of supplements 1-30.

Supplement 38. A network device, including the apparatus as described in any one of supplements 31-36.

Supplement 39. A communication system, including the user equipment as described in supplement 37 and the network device as described in supplement 38.

Supplement 40. A transmission method of feedback information, applied to a first user equipment side or a second user equipment side, the method including:

receiving sidelink feedback information by the first user equipment, or generating sidelink feedback information by the second user equipment; and transmitting the sidelink feedback information to a network device, the sidelink feedback information being feedback information of sidelink transmission from the first user equipment to the second user equipment.

Supplement 41. The method according to supplement 40, wherein the method is applied to the second user equipment side, and the method further includes:

receiving indication information related to transmission of feedback information from the first user equipment or the network device;

and the transmitting the sidelink feedback information of sidelink transmission from the first user equipment to the second user equipment to a network device includes:

according to the indication information related to transmission of feedback information, transmitting the feedback information of sidelink transmission from the first user equipment to the second user equipment to the network device.

Supplement 42. The method according to supplement 41, wherein, the indication information related to transmission of feedback information includes a time for transmitting the feedback information of sidelink transmission and/or a resource used for transmitting the feedback information of sidelink transmission.

Supplement 43. The method according to supplement 41, wherein, the time for transmitting the feedback information of sidelink transmission by the first transmitting unit is contained in the indication information related to transmission of feedback information, or is predefined, or is preconfigured;

and the time for transmitting the feedback information of sidelink transmission is:

a first time after a last symbol of a physical downlink control channel (PDCCH) carrying the indication information related to transmission of feedback information received from the first user equipment or the network device or a last symbol of a slot where the physical downlink control channel is located, or a second time after a last symbol of a physical sidelink shared channel (PSSCH) carrying sidelink-transmitted data received from the first user equipment or a last symbol of a slot where the physical sidelink shared channel is located.

Supplement 44. The method according to supplement 41, wherein, the indication information related to transmission of feedback information is transmitted via control signaling.

Supplement 45. The method according to supplement 44, wherein, when the indication information related to transmission of feedback information is received from the first user equipment, the control signaling is borne by a physical sidelink control channel (PSCCH); and/or when the indication information related to transmission of feedback information is received from the network device, the control signaling is borne by a physical downlink control channel (PDCCH).

Supplement 46. The method according to supplement 45, wherein, domains related to scheduling in the physical downlink control channel are set to be invalid, and domains related to feedback are set to be valid.

Supplement 47. The method according to supplement 40, wherein the method is applied to the first user equipment side, and the method further includes:

receiving the indication information related to transmission of feedback information from the network device;

the receiving sidelink feedback information includes:

receiving the feedback information of sidelink transmission from the first user equipment to the second user equipment from the second user equipment, and the transmitting feedback information of sidelink transmission from the first user equipment to the second user equipment to the network device includes:

according to the received indication information related to transmission of feedback information, transmitting the feedback information of sidelink transmission from the first user equipment to the second user equipment to the network device.

Supplement 48. The method according to supplement 47, wherein, the receiving the indication information related to transmission of feedback information from the network device includes:

receiving the indication information related to transmission of feedback information via a physical downlink control channel (PDCCH).

Supplement 49. The method according to supplement 47, wherein, the indication information related to transmission of feedback information includes a time for transmitting the feedback information of sidelink transmission and/or a resource used for transmitting the feedback information of sidelink transmission.

Supplement 50. The method according to supplement 49, wherein, the time for transmitting the feedback information of sidelink transmission is:

a third time after a last symbol of a PDCCH carrying the indication information related to transmission of feedback information received from the third receiving unit or a last symbol of a slot where the PDCCH is located, or, a fourth time after a last symbol of a PSSCH carrying sidelink-transmitted data transmitted to the second user equipment or a last symbol of a slot where the PSSCH is located.

Supplement 51. A transmission method of feedback information, applied to a first user equipment side, the method including:

receiving indication information related to transmission of feedback information from a network device; and forwarding the indication information related to transmission of feedback information to a second user equipment;

wherein the first user equipment performs sidelink transmission to the second user equipment.

Supplement 52. The method according to supplement 51, wherein, the forwarding the indication information related to transmission of feedback information to a second user equipment includes:

transmitting the indication information related to transmission of feedback information to the second user equipment via a physical sidelink control channel (PSCCH).

Supplement 53. The method according to supplement 51, wherein, the receiving indication information related to transmission of feedback information from a network device includes:

receiving the indication information related to transmission of feedback information via a physical downlink control channel (PDCCH).

Supplement 54. A transmission method of feedback information, applied to a second user equipment side, the method including:

transmitting to a first user equipment feedback information of sidelink transmission performed by the first user equipment to a second user equipment.

Supplement 55. A transmission method of feedback information, applied to a user equipment side, the method including:

transmitting feedback information of sidelink transmission from the user equipment to another user equipment and feedback information of downlink transmission between the user equipment and a network device to the network device.

Supplement 56. The method according to supplement 55, wherein, the feedback information of sidelink transmission and the feedback information of downlink transmission are transmitted on identical or different resources.

Supplement 57. The method according to supplement 56, wherein, the feedback information of sidelink transmission is transmitted via a first resource indicated by a first physical downlink control channel scheduling sidelink transmission, the feedback information of downlink transmission is transmitted via a second resource indicated by a second physical downlink control channel scheduling downlink transmission, and the first resource and the second resource are identical or different.

Supplement 58. The method according to supplement 55, wherein, feedback information combined by the feedback information of sidelink transmission and the feedback information of downlink transmission is transmitted to the network device.

Supplement 59. The method according to supplement 58, wherein, the combined feedback information includes:

feedback codewords formed by ranking and cascading feedback results in a predetermined order of carriers of the downlink transmission and carriers of the sidelink transmission first and then in an order of transmission occasions, the predetermined order being that the carriers of the downlink transmission are in the front and the carriers of the sidelink transmission are at the back, or the carriers of the sidelink transmission are in the front and the carriers of the downlink transmission are at the back, or feedback codewords formed by cascading first feedback codewords formed by ranking and cascading feedback results in an order of carriers of the downlink transmission and then in an order of transmission occasions and second feedback codewords formed by ranking and cascading the feedback results in an order of carriers of the sidelink transmission and then in an order of the transmission occasions; wherein, the first feedback codewords are in front of the second feedback codewords, or the first feedback codewords are behind the second feedback codewords.

Supplement 60. A transmission method of feedback information, applied to a first user equipment side, the method including:

receiving indication information related to transmission of feedback information from a network device;

respectively receiving, from at least two second user equipments belonging to a group, feedback information of sidelink transmission from the first user equipment to the at least two second user equipments; and transmitting feedback information of sidelink transmission to the network device according to the indication information related to transmission of feedback information and the feedback information of sidelink transmission from the first user equipment to the at least two second user equipments.

Supplement 61. The method according to supplement 60, wherein, the receiving indication information related to transmission of feedback information from a network device includes:

receiving the indication information related to transmission of feedback information via a physical downlink control channel (PDCCH).

Supplement 62. The method according to supplement 60, wherein, the indication information related to transmission of feedback information includes a time for transmitting the feedback information of sidelink transmission and/or a resource used for transmitting the feedback information of sidelink transmission.

Supplement 63. The method according to supplement 62, wherein, the time for transmitting the feedback information of sidelink transmission by the fifth transmitting unit is:

a third time after a last symbol of a PDCCH carrying the indication information related to transmission of feedback information received from the fifth receiving unit or a last symbol of a slot where the PDCCH is located from the network device, or, a fourth time after a last symbol of a PSSCH carrying sidelink-transmitted data transmitted to the at least two second user equipments or a last symbol of a slot where the PSSCH is located.

Supplement 64. The method according to supplement 60, wherein, the feedback information of sidelink transmission transmitted to the network device includes:

feedback codewords formed by cascading at least two feedback codewords of sidelink transmissions from the first user equipment to the at least two second user equipments respectively received from the at least two second user equipments, or feedback codewords formed by cascading feedback results in a predetermined order of carriers of sidelink transmissions from the first user equipment to the at least two second user equipments and then in an order of transmission occasions, the predetermined order being an order of sequence numbers of the at least two second user equipments.

Supplement 65. The method according to supplement 60, wherein the transmitting feedback information of sidelink transmission to the network device according to the indication information related to transmission of feedback information and the feedback information of sidelink transmission from the first user equipment to the at least two second user equipments includes:

performing comprehensive processing on the feedback information of sidelink transmissions from the first user equipment to the at least two second user equipments to obtain overall feedback information of sidelink transmissions from the first user equipment to the at least two second user equipments; and transmitting the overall feedback information to the network device.

Supplement 66. The method according to supplement 65, wherein, the comprehensive processing is a logic "and" computing process.

Supplement 67. The method according to supplement 60, wherein the method further includes:

transmitting feedback information of downlink transmission between the first user equipment and the network device to the first user equipment.

Supplement 68. The method according to supplement 67, wherein, the feedback information of sidelink transmission and the feedback information of downlink transmission are transmitted on identical or different resources.

Supplement 69. The method according to supplement 67, wherein, feedback information combined by the feedback information of sidelink transmission and the feedback information of downlink transmission is transmitted to the network device.

Supplement 70. A transmission method of feedback information, applied to a network device side, the method including:

transmitting indication information related to transmission of feedback information to a first user equipment or a second user equipment; and receiving from the first user equipment or the second user equipment feedback information of sidelink transmission from the first user equipment to the second user equipment.

Supplement 71. The method according to supplement 70, wherein, the transmitting indication information related to transmission of feedback information to a first user equipment or a second user equipment includes:
transmitting the indication information related to transmission of feedback information via a physical downlink control channel (PDCCH).

Supplement 72. The method according to supplement 70, wherein,
a second physical downlink control channel is transmitted to the second user equipment, domains related to scheduling in the second physical downlink control channel being set to be invalid, and domains related to feedback being set to be valid;
and the method further includes:
transmitting a first physical downlink control channel to the first user equipment, domains related to scheduling in the first physical downlink control channel being set to be valid, and domains related to feedback being set to be invalid.

Supplement 73. A transmission method of feedback information, applied to a network device side, the method including:
transmitting indication information related to transmission of feedback information to a first user equipment; and
receiving from the first user equipment feedback information of sidelink transmission from the first user equipment to at least two second user equipments belonging to a group as the first user equipment.

Supplement 74. The method according to supplement 73, wherein the method further includes:
performing comprehensive processing on the feedback information of sidelink transmissions from the first user equipment to the at least two second user equipments to obtain overall feedback information of sidelink transmissions from the first user equipment to the at least two second user equipments.

Supplement 75. The method according to supplement 73, wherein,
the feedback information of sidelink transmission received from the first user equipment is overall feedback information obtained by performing comprehensive processing on the feedback information of sidelink transmissions from the first user equipment to the at least two second user equipments.

What is claimed is:

1. A transmission apparatus of feedback information, provided at a first user equipment side, the apparatus comprising:
a receiver configured to receive indication information related to transmission of feedback information from a network device, and
respectively receive, from at least two second user equipments belonging to the same group, feedback information of sidelink transmission from the first user equipment to the at least two second user equipments; and
a transmitter configured to transmit feedback information of sidelink transmission to the network device according to the indication information related to transmission of feedback information and the feedback information of sidelink transmission from the first user equipment to the at least two second user equipments.

2. The apparatus according to claim 1, further comprising a processor configured to determine overall feedback information of sidelink transmissions from the first user equipment to the at least two second user equipments according to the feedback information of sidelink transmissions from the first user equipment to the at least two second user equipments, and transmits the overall feedback information to the network device.

3. The apparatus according to claim 2, wherein the processor is configured to perform a logic "and" computing process on the feedback information of sidelink transmissions from the first user equipment to the at least two second user equipments to obtain the overall feedback information.

4. The apparatus according to claim 3, wherein,
when the feedback information of sidelink transmissions from the first user equipment to the at least two second user equipments are all "1", the processor is configured to determine the overall feedback information as "1"; and
when the feedback information of sidelink transmissions from the first user equipment to the at least two second user equipments comprises at least one "0", the processor is configured to determine the overall feedback information as "0",
wherein, the "1" represents "ACK" and the "0" represents "NACK".

5. A transmission apparatus of feedback information, provided at a network device side, the apparatus comprising:
a transmitter configured to transmit indication information related to transmission of feedback information to a first user equipment; and
a receiver configured to receive, from the first user equipment feedback information of sidelink transmission from the first user equipment to at least two second user equipments belonging to the same group, wherein the first user equipment transmits feedback information of sidelink transmission to the network device according to the indication information related to transmission of feedback information and the feedback information of sidelink transmission from the first user equipment to the at least two second user equipments.

6. The apparatus according to claim 5, wherein the receiver is further configured to receive overall feedback information of sidelink transmission from the first user equipment to the at least two second user equipments.

7. The apparatus according to claim 5, wherein,
the feedback information of sidelink transmission received from the first user equipment is overall feedback information determined according to the feedback information of sidelink transmissions from the first user equipment to the at least two second user equipments.

8. The apparatus according to claim 7, wherein
a processor is configured to reschedule a resource so that the first user equipment retransmits to a second user equipment when the overall feedback information represents "NACK".

* * * * *